United States Patent
Fujiwara et al.

(10) Patent No.: US 9,916,304 B2
(45) Date of Patent: Mar. 13, 2018

(54) METHOD OF CREATING TRANSLATION CORPUS

(71) Applicant: Panasonic Intellectual Property Management Co., Ltd., Osaka (JP)

(72) Inventors: Nanami Fujiwara, Nara (JP); Masaki Yamauchi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/381,978

(22) Filed: Dec. 16, 2016

(65) Prior Publication Data

US 2017/0220561 A1 Aug. 3, 2017

(30) Foreign Application Priority Data

Feb. 1, 2016 (JP) .................. 2016-017111

(51) Int. Cl.
*G06F 17/28* (2006.01)
*G06F 17/20* (2006.01)

(52) U.S. Cl.
CPC ................ *G06F 17/2827* (2013.01)

(58) Field of Classification Search
CPC .............. G06F 17/254; G06F 17/2809; G06F 17/2827; G06F 17/2836; G06F 17/2872; G06F 17/289
USPC .......................... 704/2, 4, 7, 9, 10
See application file for complete search history.

(56) References Cited

FOREIGN PATENT DOCUMENTS

| JP | 2002-278963 | 9/2002 |
|---|---|---|
| JP | 2005-071291 | 3/2005 |
| JP | 2006-190072 | 7/2006 |
| JP | 2015-118498 | 6/2015 |

OTHER PUBLICATIONS

Nitin Madnani et al., "Generating Targeted Paraphrases for Improved Translation", ACM Transactions on Intelligent Systems and Technology, vol. 4, No. 3, Article40, Publication date:Jun. 2013.
Yuval Marton, "Distributional Phrasal Paraphrase Generation for Statistical Machine Translation", ACM Transactions on Intelligent Systems and Technology, vol. 4, No. 3, Article39, Publication date:Jun. 2013.

*Primary Examiner* — Thierry L Pham
(74) *Attorney, Agent, or Firm* — Greenblum & Bernstein, P.L.C.

(57) ABSTRACT

A translation corpus creation method of the present disclosure includes generating plural paraphrasing candidate sentences for a first original sentence in a first language by paraphrasing one or plural fragments among plural fragments included in the first original sentence into other expressions in the first language by a paraphrasing candidate sentence generation unit, identifying one or plural paraphrasing candidate sentences in the same meaning as the meaning of the first original sentence from the plural paraphrasing candidate sentences as one or plural paraphrasing sentences by a paraphrasing sentence identification unit, and generating a new set of sentences by setting the one or plural identified paraphrasing sentences and a second original sentence translated from the first original sentence as a set of sentences to create a translation corpus with the generated and new set of sentences by a translation corpus creation unit.

8 Claims, 17 Drawing Sheets

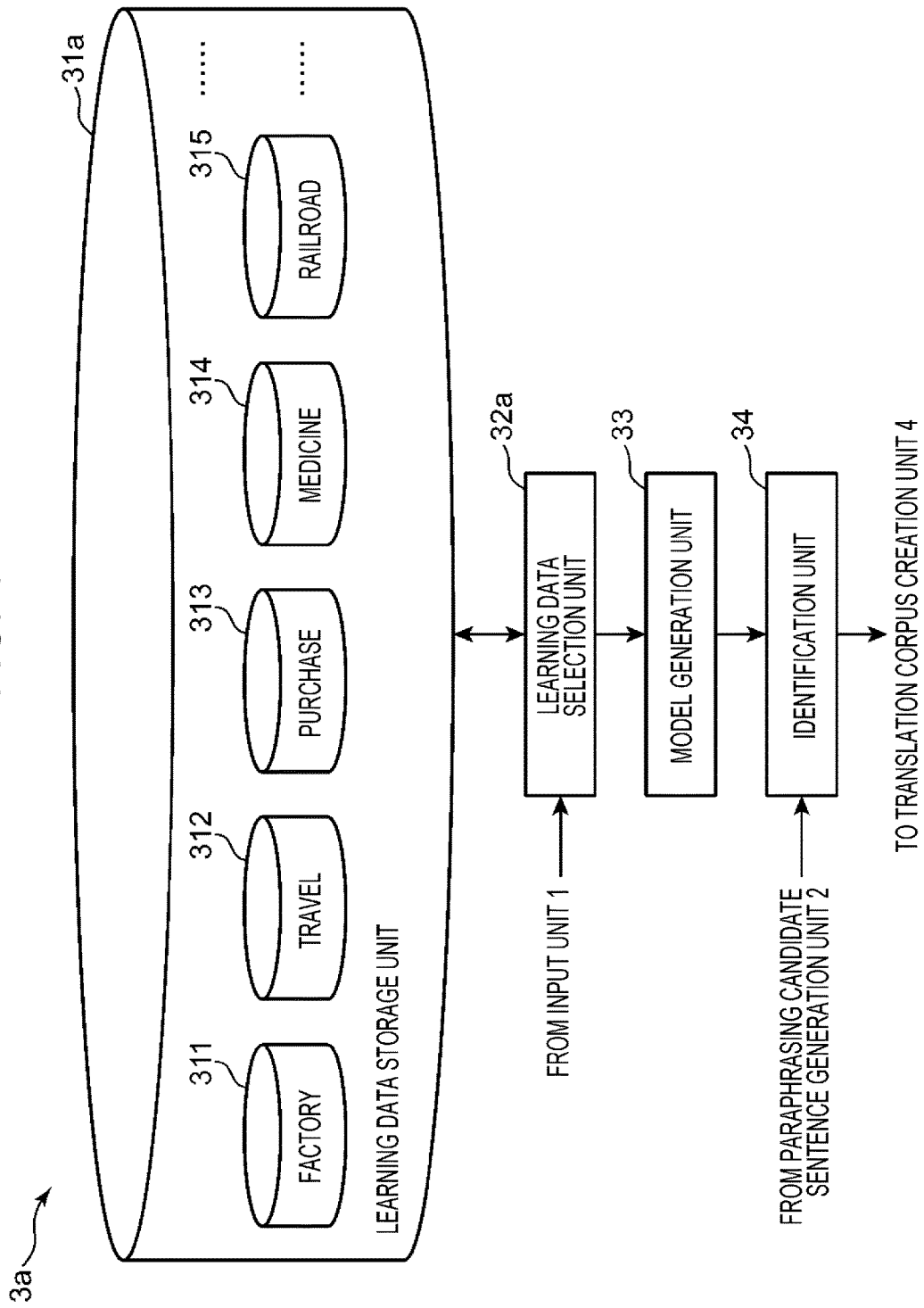

FIG. 11A

|  | PROBABILITY | | |
|---|---|---|---|
|  | LANGUAGE MODEL OF INPUT CORPUS | TRAVEL LANGUAGE MODEL | TRAFFIC LANGUAGE MODEL |
| BASU/NI/NORU | 0.03 | 0.05 | 0.10 |
| UMA/NI/NORU | 0.01 | 0.04 | 0.00004 |
| KURUMA/NI/NORI | 0.06 | 0.008 | 0.03 |
|  | ... | | |

FIG. 11B

| INPUT CORPUS | PROBABILITY | |
|---|---|---|
|  | TRAVEL LANGUAGE MODEL | TRAFFIC LANGUAGE MODEL |
| BASU/NI/NORU | 0.05 | 0.02 |
| UMA/NI/NORU | 0.04 | 0.00004 |
|  | ... | |

FIG. 16

[CONTENTS OF LEARNING DATA]

- 305-1: OSAKAJO NI IKU YOTEI DESU. ○
- 305-2: OSAKAJO NI IKI MASU YOTEI DESU. ×
- 305-3: UENO MADE IKI TAI NO DESU GA. ○
- 305-4: ~~AKAWAIN HA ARI MASU KA?~~ ○
- 305-5: AKAWAIN SONZAI? ×
- 305-6: HOZUGAWAKUDARI O SURU NI HA DO SHITA RA YOI DESU KA? ○
- 305-7: HOZUGAWAKUDARI DO YOI? ×
- 305-8: TORUKURENCHI O KASHI TE HOSHII NO DESU GA. ○
- 305-9: KONO DOGU NO TSUKAI KATA O OSHIE TE KUDA SAI. ○

↑ SELECTED AS LEARNING DATA OF "GIFUJO NI IKI TAI DESU." — OS3

METHOD OF CREATING TRANSLATION CORPUS

BACKGROUND

1. Technical Field

The present disclosure relates to a translation corpus creation method that creates a translation corpus which accumulates pairs of sentences formed with mutually different languages, a translation corpus creation device, a recording medium storing a translation corpus creation program, and a machine translation system that uses the translation corpus creation device.

2. Description of the Related Art

In recent years, machine translation has been studied and developed in which a sentence in a first language is translated into a sentence in a second language that is different from the first language. For example, various techniques have been suggested such as Japanese Patent No. 3919720, Japanese Unexamined Patent Application Publication No. 2002-278963, Japanese Unexamined Patent Application Publication No. 2006-190072, Japanese Unexamined Patent Application Publication No. 2015-118498, "Generating Targeted Paraphrases for Improved Translation", Nitin Madnani, Educational Testing Service, ACM, 2013, and "Distributional Phrasal Paraphrase Generation for Statistical Machine Translation", Yuval Marton, University of Maryland, Columbia University, ACM, 2013.

SUMMARY

Incidentally, accumulation of more usable example sentences for translation is preferable for performance improvement of machine translation. That is, a translation corpus preferably accumulates more pairs of sentences, and creation of the translation corpus has a room for improvement.

One non-limiting and exemplary embodiment provides a translation corpus creation method, a translation corpus creation device, and a recording medium that stores a translation corpus creation program, which are further improved, and a machine translation system that uses the translation corpus creation device.

In one general aspect, the techniques disclosed here feature a translation corpus creation method, a translation corpus creation device, a recording medium storing a translation corpus creation program, and a machine translation system that uses the translation corpus creation device, which include: generating plural paraphrasing candidate sentences for a first original sentence by paraphrasing one or plural fragments among plural fragments that are included in the first original sentence in a first language into other expressions in the first language; identifying one or plural paraphrasing candidate sentences in a same meaning as a meaning of the first original sentence from the plural paraphrasing candidate sentences as one or plural paraphrasing sentences; and creating a translation corpus by generating a new pair of sentences by setting the one or plural identified paraphrasing sentences and a second original sentence that is translated from the first original sentence as a pair of sentences to create a translation corpus with the generated and new pair of sentences.

A translation corpus creation method, a translation corpus creation device, a recording medium storing a translation corpus creation program, and a machine translation system that uses the translation corpus creation device, according to the present disclosure, may improve creation of a translation corpus.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 4 is a block diagram that illustrates a configuration of a paraphrasing sentence identification unit in the translation corpus creation device;

FIG. 11A is a diagram for explaining a selection method of a first mode of the paraphrasing database and the learning data collection;

FIG. 11B is a diagram for explaining the selection method of the first mode of the paraphrasing database and the learning data collection;

FIG. 16 is a diagram for explaining an action of the paraphrasing sentence identification unit of the modification;

DETAILED DESCRIPTION

Figure 1:
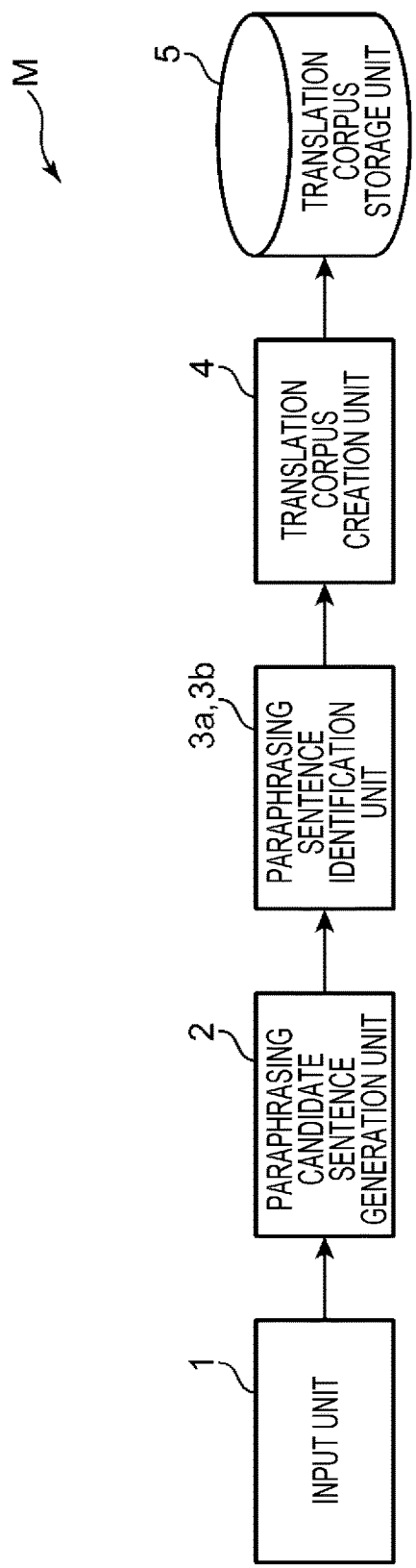
FIG. 1 is a block diagram that illustrates a configuration of a translation corpus creation device according to the first embodiment.

One embodiment according to the present disclosure will be described hereinafter with reference to drawings. Note that configurations provided with the same reference characters in the drawings indicate the same configurations, and a description thereof will not be made appropriately. Herein, in a case where configurations are referred to as generic terms, those will be denoted by reference characters without suffixes. In a case where an individual configuration is indicated, that will be denoted by a reference character with a suffix.

Figure 2:
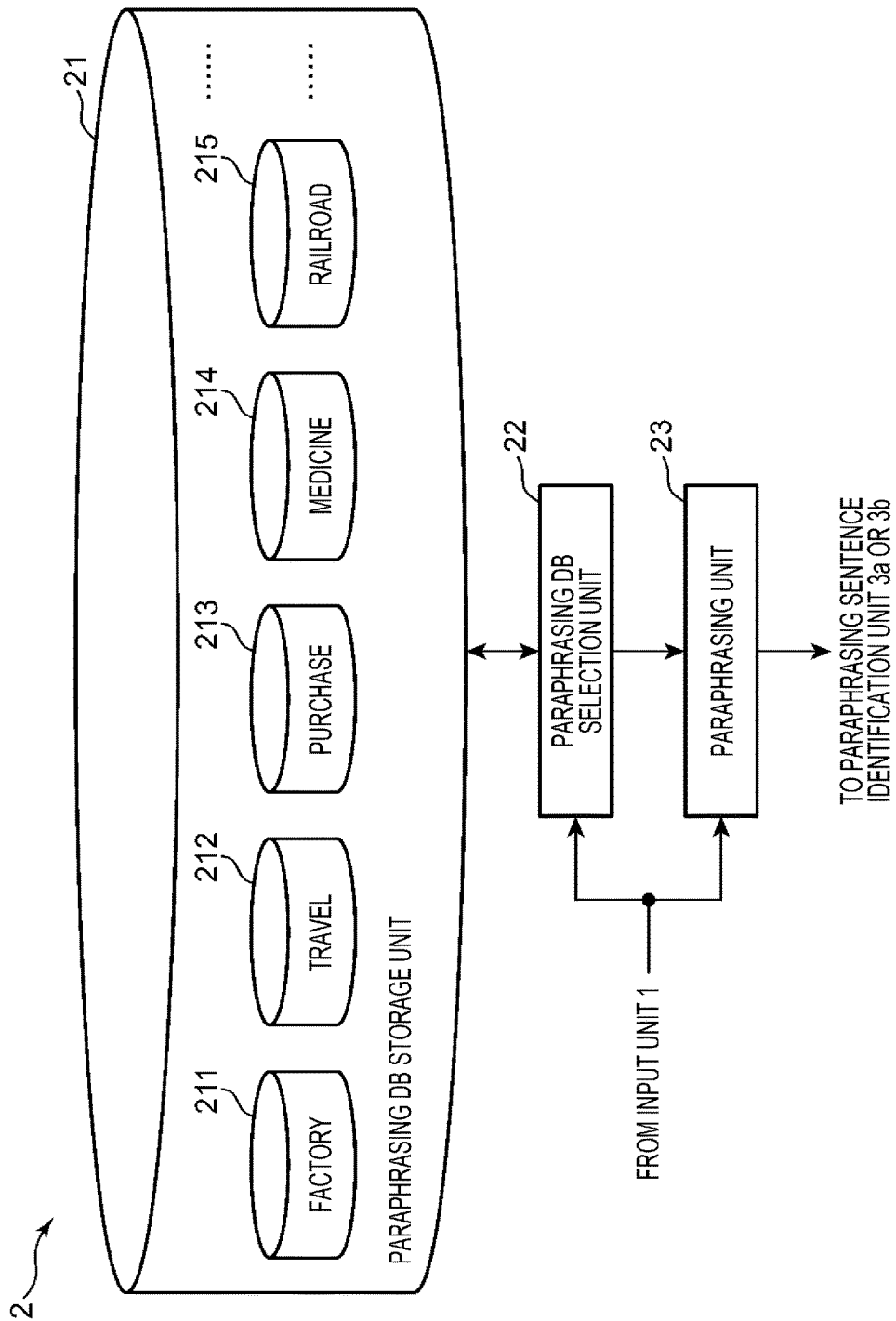
FIG. 2 is a block diagram that illustrates a configuration of a paraphrasing candidate sentence generation unit in the translation corpus creation device.
Figure 3:
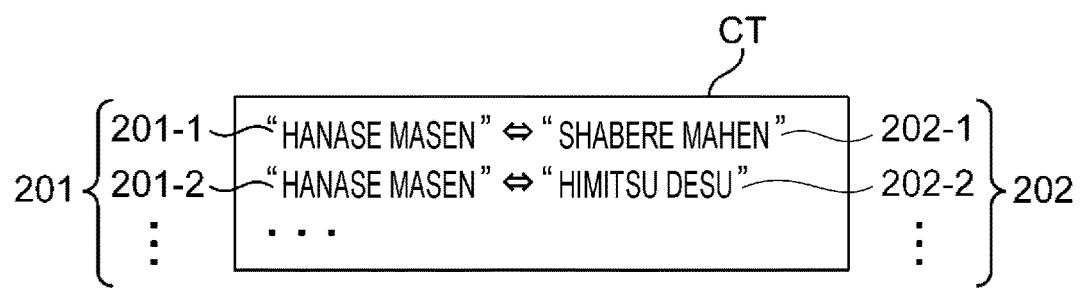
FIG. 3 is a diagram that illustrates one example of a paraphrasing database that is stored in a paraphrasing database storage unit in the paraphrasing candidate sentence generation unit.
Figures 5A, 5B:
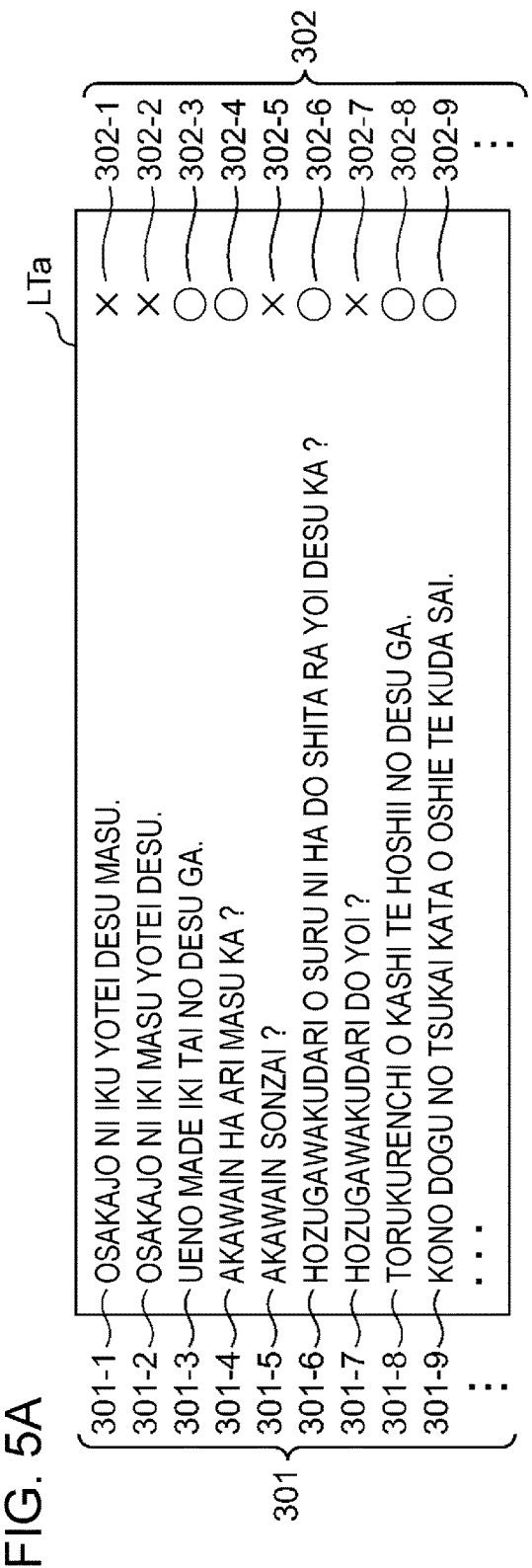
FIG. 5A is a diagram that illustrates one example of a learning data collection that is stored in the learning data storage unit in the paraphrasing sentence identification unit.
FIG. 5B is a diagram that illustrates one example of the learning data collection that is stored in the learning data storage unit in the paraphrasing sentence identification unit.

First Embodiment; Translation Corpus Creation Method, Translation Corpus Creation Device, and Translation Corpus Creation Program FIG. 1 is a block diagram that illustrates a configuration of a translation corpus creation device according to the first embodiment. FIG. 2 is a block diagram that illustrates a configuration of a paraphrasing candidate sentence generation unit in the translation corpus creation device. FIG. 3 is a diagram that illustrates one example of a paraphrasing database that is stored in a paraphrasing database storage unit in the paraphrasing candidate sentence generation unit. FIG. 4 is a block diagram that illustrates a configuration of a paraphrasing sentence identification unit in the translation corpus creation device. FIGS. 5A and 5B are diagrams that illustrate examples of a learning data collection that is stored in a learning data storage unit in the paraphrasing sentence identification unit. FIG. 5A illustrates the learning data collection of a first mode, and FIG. 5B illustrates the learning data collection of a second mode.

A translation corpus creation device M in the embodiment is a device that creates a translation corpus, in which plural pairs of sentences are collected, each pair having a first sentence in a first language paired with a second sentence in a second language different from the first language, includes an input unit 1, a paraphrasing candidate sentence generation unit 2, a paraphrasing sentence identification unit 3a, and a translation corpus creation unit 4, for example, as illustrated in FIG. 1, and further includes a translation corpus storage unit 5 that stores the created translation corpus in the example illustrated in FIG. 1. The translation corpus storage unit 5 may be included in an external apparatus (for example, a server computer or the like) that is a separate body from the translation corpus creation device M. In this case, the translation corpus creation device M illustrated in FIG. 1 includes an interface unit that communicates data with the external apparatus instead of the translation corpus storage unit 5 and outputs the created translation corpus to the external apparatus via the interface unit. The interface unit is an interface circuit that uses the USB standard, a communication interface circuit in accordance with the IEEE 802.11 standard or the like, for example.

The translation corpus creation device M that includes such units 1 to 5 is configured with an information processing device, for example. The information processing device includes a computer that includes a central processing unit (CPU), a read-only memory (ROM), a random access memory (RAM), and an auxiliary storage device, a display that outputs data by displaying the data, and an input device by which data are input. As such an information processing device, for example, an information processing device of a non-portable type such as a desktop type computer may be employed, or an information processing device of a portable type such as a laptop type computer or tablet type computer may be employed.

Each block illustrated in FIG. 1 is realized by execution of a program that is stored in the auxiliary storage device and causes the computer to function as the translation corpus creation device M (a translation corpus creation program) by the CPU, for example. Accordingly, the computer implements a translation corpus creation method. In FIG. 1, the blocks illustrated by rectangles are functionally realized mainly by the CPU, and the block illustrated by a cylindrical shape is functionally realized by a storage device that is configured mainly with the ROM, the RAM, the auxiliary storage device, and the like. The same applies to FIGS. 2, 4, 15, and 18, which will be described later.

The input unit (first input unit) 1 is a circuit that is connected with the paraphrasing candidate sentence generation unit 2, receives prescribed operations, for example, and inputs data to the translation corpus creation device M. The input unit 1 is an input device such as a keyboard or a mouse that includes plural input switches and so forth to which prescribed functions are allocated, for example. Further, for example, the input unit 1 may be an interface unit that communicates data with the external apparatus and is similar to the above-described interface unit. The prescribed operations include various kinds of operations and so forth that are requested for creation of the translation corpus by the translation corpus creation device M, such as an input operation of first and second original sentences for inputting the first original sentence in the first language and the second original sentence that is the first original sentence which is translated into the second language different from the first language to the translation corpus creation device M and an input operation of a start command for instructing the translation corpus creation device M to create the translation corpus, for example.

The paraphrasing candidate sentence generation unit 2 is connected with the paraphrasing sentence identification unit 3a and generates plural paraphrasing candidate sentences for the first original sentence by paraphrasing (replacing) one or plural fragments, which are formed by dividing a sentence in accordance with a preset and prescribed rule and which are included in the first original sentence which is received by the input unit 1, into other expressions in the first language. The prescribed rule may be an arbitrary rule. For example, the prescribed rule may be a rule that divides a sentence by separation into each plural n characters (for example, two characters, three characters, or the like). In this case, the fragment becomes the plural n characters. Further, for example, the prescribed rule may be a rule that divides a sentence by separation into each word. In this case, the fragment becomes the word. Further, for example, the prescribed rule may be a rule that divides a sentence by separation into each part of speech. In this case, the fragment becomes a word of the part of speech. Further, for example, the prescribed rule may be a rule that divides a sentence by separation into each phrase. In this case, the fragment becomes the phrase. Further, for example, the prescribed rule may be a rule that divides a sentence by separation into each meaning class. In this case, the fragment becomes a word of the meaning class. Further, for example, the prescribed rule may be a rule that divides a sentence by separation into each morpheme in a morpheme analysis. In this case, the fragment becomes the morpheme. As described above, the paraphrasing candidate sentence for the first original sentence in the first language is the sentence in which one or plural fragments that are included in the first original sentence are paraphrased (replaced) into other expressions in the first language. It is not necessarily be ensured that the paraphrasing candidate sentence for the first original sentence in the first language has the same meaning as the first original sentence. Accordingly, the paraphrasing candidate sentence for the first original sentence is generated without consideration of the meaning of the first original sentence. Although the same fragment in the first original sentence may be paraphrased plural times, it is highly possible that the paraphrasing candidate sentence has a different meaning from the first original sentence in a case where the same fragment is paraphrased plural times. Thus, the paraphrasing frequency of the same fragment is preferably limited to a low frequency such as one time or two times, for example.

More specifically, for example, as illustrated in FIG. 2, such a paraphrasing candidate sentence generation unit 2 includes a paraphrasing database storage unit (paraphrasing DB storage unit) 21, a paraphrasing database selection unit (paraphrasing DB selection unit) 22, and a paraphrasing unit 23.

The paraphrasing DB storage unit 21 is connected with the paraphrasing DB selection unit 22 and stores a paraphrasing database (paraphrasing DB). The paraphrasing DB is a database in which a first fragment in the first language is mutually associated with a second fragment which expresses the first fragment by another expression in the first language. For example, as illustrated in FIG. 3, a first fragment 201-1 in the first language and a second fragment 202-1 that is associated with the first fragment 201-1 and expresses the first fragment 201-1 by another expression in the first language are stored in the paraphrasing DB storage unit 21 as one datum in a paraphrasing DB CT.

In this embodiment, as illustrated in FIG. 2, the paraphrasing DB storage unit 21 stores plural paraphrasing DBs that are classified in accordance with a preset and prescribed classification scheme. The prescribed classification scheme may an appropriate classification scheme in accordance with the use of the translation corpus creation device M. The prescribed classification scheme may be a classification scheme that performs classification into each genre, for example, and may be a classification scheme that performs classification into each industrial field, for example. In the example illustrated in FIG. 2, the plural paraphrasing DBs include a paraphrasing DB for factory for paraphrasing fragments used in factories, a paraphrasing DB for travel for paraphrasing fragments used in travel, a paraphrasing DB for purchase for paraphrasing fragments used in purchase, a paraphrasing DB for medicine for paraphrasing fragments used in medicine, a paraphrasing DB for railroad for paraphrasing fragments used in the railroad, and so forth. In order to store each of those paraphrasing DBs, the paraphrasing DB storage unit 21 includes a factory paraphrasing DB storage unit 211 that stores the paraphrasing DB for factory, a travel paraphrasing DB storage unit 212 that stores the paraphrasing DB for travel, a purchase paraphrasing DB storage unit 213 that stores the paraphrasing DB for purchase, a medicine paraphrasing DB storage unit 214 that stores the paraphrasing DB for medicine, a railroad paraphrasing DB storage unit 215 that stores the paraphrasing DB for railroad, and so forth. Note that data of the paraphrasing DB of certain classification may be data of the paraphrasing DB of other classification. In this embodiment, those plural paraphrasing DBs are provided with identifiers (ID) for specifying and identifying the respective paraphrasing DBs.

The paraphrasing DB selection unit 22 is connected with each of the input unit 1 and the paraphrasing unit 23 and selects the paraphrasing DB that corresponds to the first original sentence received by the input unit 1 from the plural paraphrasing DBs stored in the paraphrasing DB storage unit 21 in accordance with a prescribed selection method. The paraphrasing DB selection unit 22 outputs the selection result to the paraphrasing unit 23. The prescribed selection method may be an arbitrary method as long as the method may select the paraphrasing DB that most matches the first original sentence received by the input unit 1 from the plural paraphrasing DBs stored in the paraphrasing DB storage unit 21. For example, the prescribed selection method is a method that selects the paraphrasing DB which has the closest language model from the plural paraphrasing DBs (the selection method of a first mode). Further, for example, the prescribed selection method is a method that selects the paraphrasing DB which is in the most similar class from the plural paraphrasing DBs (the selection method of a second mode). Further, for example, the prescribed selection method is a method that selects the paraphrasing DB which has the most similar frequent vocabularies or unique vocabularies from the plural paraphrasing DBs (the selection method of a third mode). Those selection methods will be described later more in detail.

The paraphrasing unit 23 is connected with each of the input unit 1 and the paraphrasing sentence identification unit 3a, paraphrases one or plural fragments that are included in the first original sentence received by the input unit 1 into another expression in the first language based on the paraphrasing DB selected by the paraphrasing DB selection unit 22, and thereby generates plural paraphrasing candidate sentences for the first original sentence. For example, in a case where first fragments 201-1 and 201-2 in the first language illustrated in FIG. 3 are included in the first original sentence received by the input unit 1, the first fragment 201-1 of the first original sentence is paraphrased into the second fragment 202-1 in the first language, and one paraphrasing candidate sentence for the first original sentence is thereby generated. Then, the first fragment 201-2 of the first original sentence is paraphrased into a second fragment 202-2 in the first language, and another paraphrasing candidate sentence for the first original sentence is thereby generated. Accordingly, in this case, the paraphrasing unit 23 generates two paraphrasing candidate sentences for the first original sentence. The paraphrasing unit 23 outputs the plural generated paraphrasing candidate sentences for the first original sentence to the paraphrasing sentence identification unit 3a.

The paraphrasing sentence identification unit 3a is connected with the translation corpus creation unit 4 and identifies one or plural paraphrasing candidate sentences in the same meaning as the meaning of the first original sentence from the plural paraphrasing candidate sentences generated by the paraphrasing candidate sentence generation unit 2 as one or plural paraphrasing sentences. For example, the paraphrasing sentence identification unit 3a uses an identification model for identifying (determining or discriminating) whether or not the meaning of the paraphrasing candidate sentence is the same as the meaning of the first original sentence and thereby identifies the one or plural paraphrasing sentences from the plural paraphrasing candidate sentences.

More specifically, for example, as illustrated in FIG. 4, such a paraphrasing sentence identification unit 3a includes a learning data storage unit 31a, a learning data selection unit 32a, a model generation unit 33, and an identification unit 34.

The learning data storage unit 31a is connected with the learning data selection unit 32a and stores the learning data collection. The learning data collection is formed with plural data for generating the identification model that identifies whether or not the meaning of the paraphrasing candidate sentence is the same as the meaning of the first original sentence by learning. In this embodiment, the model generation unit 33 generates the identification model by machine learning with a teacher. Thus, for example, as illustrated in FIG. 5A, a sentence 301-1 and a correctness datum 302-1 that indicates whether the sentence 301-1 is correct or incorrect in the identification are stored in the learning data storage unit 31a as one datum in a learning data collection LTa. Further, for example, as illustrated in FIG. 5B, a learning data collection LTb includes plural fragment fields 303 (303-1, 303-2, 303-3, 303-4, 303-5, 303-6, 303-7, 303-8, . . . ) that are respectively provided for plural fragments which are mutually different and a correctness data field 304 in which the correctness data are registered. The learning data collection LTb that has a record for each sentence Ln is stored in the learning data storage unit 31a (n is a positive integer). A fragment flag that indicates whether or not the sentence Ln of the record includes the fragments of the fragment fields 303 is registered in each of the fragment fields 303. A fragment flag "1" indicates that the sentence Ln of the record includes the fragments of the fragment fields 303, and a fragment flag "0" indicates that the sentence Ln of the record does not include the fragments of the fragment fields 303. In FIG. 5B, the correctness data are indicated by correctness flags. A correctness flag "1" indicates that the sentence Ln of the record is correct in the identification, and a correctness flag "0" indicates that the sentence Ln of the record is incorrect in the identification. For example, in the example illustrated in FIG. 5B, the sentence L1 of the first record is configured with the fragments of the fragment fields 303-1, 303-2, 303-3, 303-4, and 303-5 because the fragment flag "1" is registered for the fragment fields 303-1, 303-2, 303-3, 303-4, and 303-5. The sentence L1 of the first record is a correct sentence in the machine learning in the generation of the identification model because the correctness flag "1" is registered in the correctness data field 304.

In this embodiment, as illustrated in FIG. 4, the learning data storage unit 31a stores plural learning data collections that are classified in accordance with a preset and prescribed classification scheme, similarly to the paraphrasing DB storage unit 21. The prescribed classification scheme for the learning data collection is preferably the same as the prescribed classification scheme for the paraphrasing DB because the accuracy of paraphrasing in the paraphrasing unit 23 may be made equivalent to the accuracy of the identification in the identification unit 34, but may not necessarily be the same. In the example illustrated in FIG. 4, the plural learning data collections include a learning data collection for factory for generating the identification model by learning such that the paraphrasing sentence is identifiable from the paraphrasing candidate sentences of a sentence (first sentence) used in factories, a learning data collection for travel for generating the identification model by learning such that the paraphrasing sentence is identifiable from the paraphrasing candidate sentences of a sentence (first sentence) used in travel, a learning data collection for purchase for generating the identification model by learning such that the paraphrasing sentence is identifiable from the paraphrasing candidate sentences of a sentence (first sentence) used in purchase, a learning data collection for medicine for generating the identification model by learning such that the paraphrasing sentence is identifiable from the paraphrasing candidate sentences of a sentence (first sentence) used in medicine, a learning data collection for railroad for generating the identification model by learning such that the paraphrasing sentence is identifiable from the paraphrasing candidate sentences of a sentence (first sentence) used for the railroad, and so forth. In order to store each of those learning data collections, the learning data storage unit 31a includes a factory learning data storage unit 311 that stores the learning data collection for factory, a travel learning data storage unit 312 that stores the learning data collection for travel, a purchase learning data storage unit 313 that stores the learning data collection for purchase, a medicine learning data storage unit 314 that stores the learning data collection for medicine, a railroad learning data storage unit 315 that stores the learning data collection for railroad, and so forth. Note that data of the learning data collection of certain classification may be data of the learning data collection of other classification. As described above, in this embodiment, the prescribed classification scheme for the learning data collection is the same as the prescribed classification scheme for the paraphrasing DB, and an ID provided for the paraphrasing DB that is classified into the same kind as the learning data collection is assigned to each of the corresponding learning data collections. For example, the ID provided for the paraphrasing DB for factory is assigned to the learning data collection for factory. Further, for example, the ID provided for the paraphrasing DB for medicine is assigned to the learning data collection for medicine.

The learning data selection unit 32a is connected with each of the input unit 1 and the model generation unit 33 and selects the learning data collection that corresponds to the first original sentence received by the input unit 1 from the plural learning data collections stored in the learning data storage unit 31a in accordance with a prescribed selection method. The learning data selection unit 32a outputs the selection result to the model generation unit 33. The prescribed selection method may be an arbitrary method as long as the method may select the learning data collection that most matches the first original sentence received by the input unit 1 from the plural learning data collections stored in the learning data storage unit 31a. In this embodiment, the learning data selection unit 32a may employ a similar selection method to the paraphrasing DB selection unit 22. Further, as for the selection of the learning data collection, for example, a method that selects the learning data collection which has the most similar sentence length from the plural learning data collections (the selection method of a fourth mode) may be employed as the prescribed selection method.

The model generation unit 33 is connected with the identification unit 34 and generates the identification model by the machine learning based on the learning data collection selected by the learning data selection unit 32a. The machine learning uses deep learning (or multi-layer neural network) and so forth, for example. The model generation unit 33 outputs the generated identification model to the identification unit 34.

The identification unit 34 is connected with each of the paraphrasing candidate sentence generation unit 2 and the translation corpus creation unit 4 and identifies one or plural paraphrasing sentences that are identified from one or plural paraphrasing candidate sentences generated by the paraphrasing candidate sentence generation unit 2 based on the identification model generated by the model generation unit 33. The identification unit 34 outputs one or plural paraphrasing sentences that are obtained by this identification to the translation corpus creation unit 4.

The translation corpus creation unit 4 is connected with the translation corpus storage unit 5, generates a new pair of sentences by setting one or plural paraphrasing sentences identified by the paraphrasing sentence identification unit 3a and the second original sentence received by the input unit 1 as a pair of sentences, and creates a new translation corpus with the generated and new pair of sentences, or creates (updates) a translation corpus by adding the generated and new pair of sentences to an existing translation corpus. More specifically, in a case where the translation corpus is not stored in the translation corpus storage unit 5, the translation corpus creation unit 4 creates a new translation corpus with the generated and new pair of sentences and stores the created and new translation corpus in the translation corpus storage unit 5. Meanwhile, in a case where the translation corpus is stored in the translation corpus storage unit 5, the translation corpus creation unit 4 creates (updates) a translation corpus by adding the generated and new pair of sentences to the existing translation corpus that is stored in the translation corpus storage unit 5.

Figure 6:
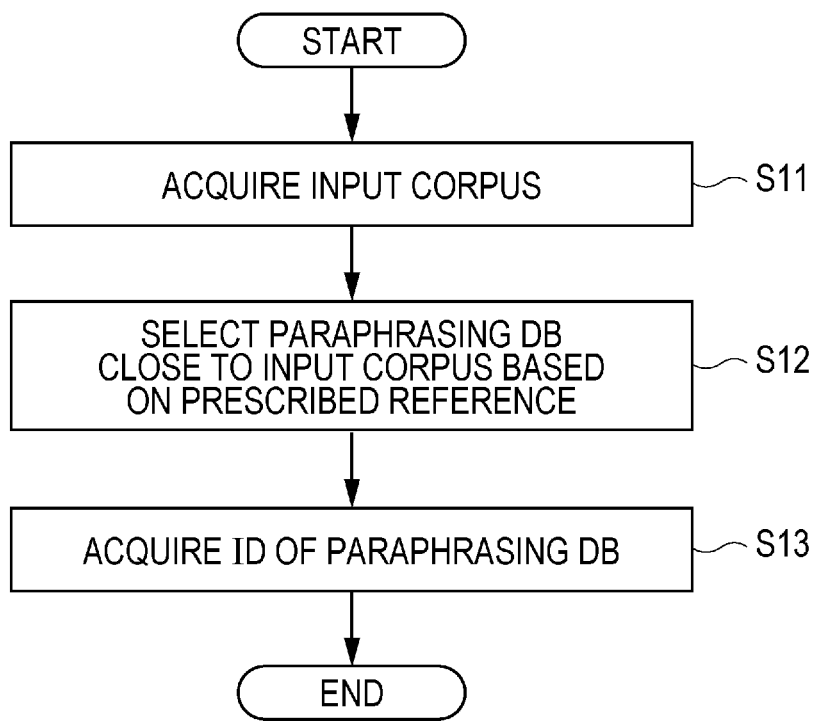
FIG. 6 is a flowchart that illustrates an action of a paraphrasing database selection unit in the paraphrasing candidate sentence generation unit.
Figure 7:
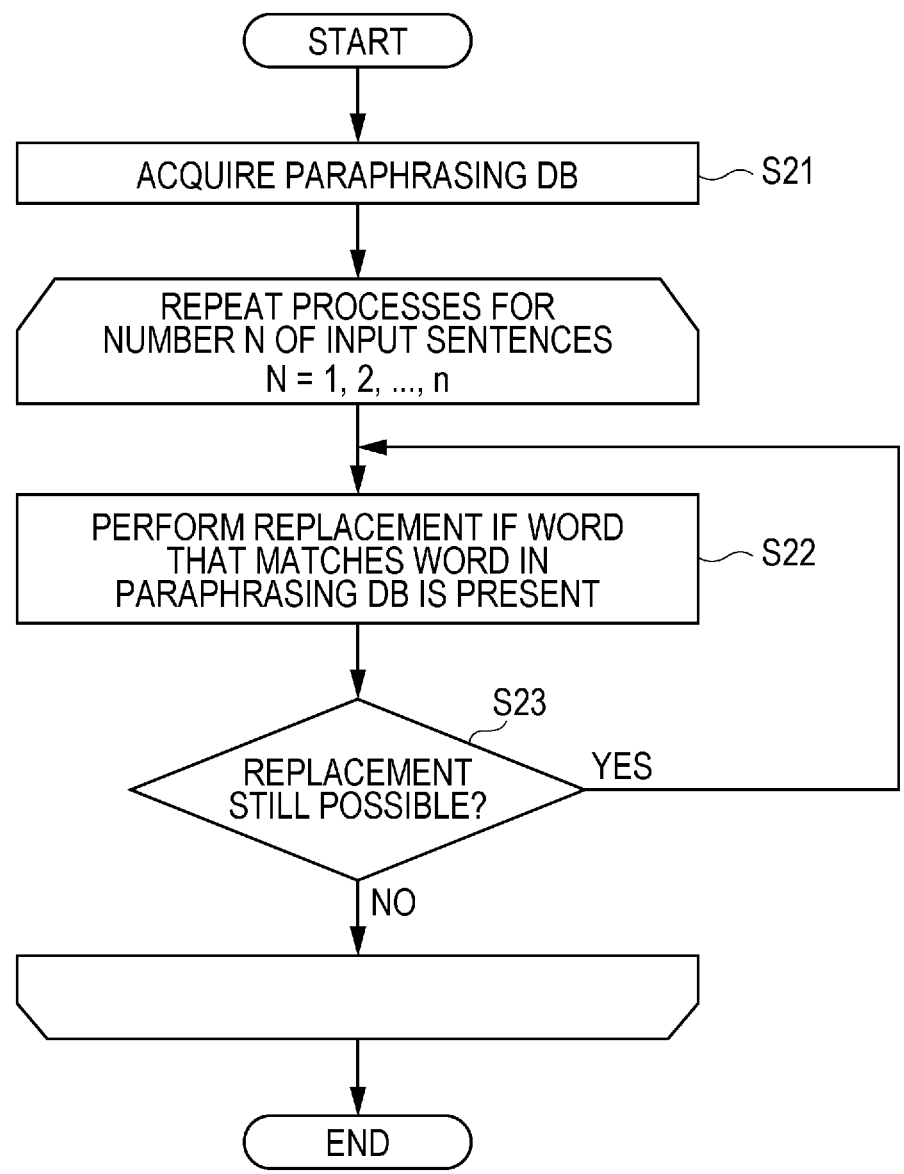
FIG. 7 is a flowchart that illustrates an action of a paraphrasing unit in the paraphrasing candidate sentence generation unit.
Figure 8:
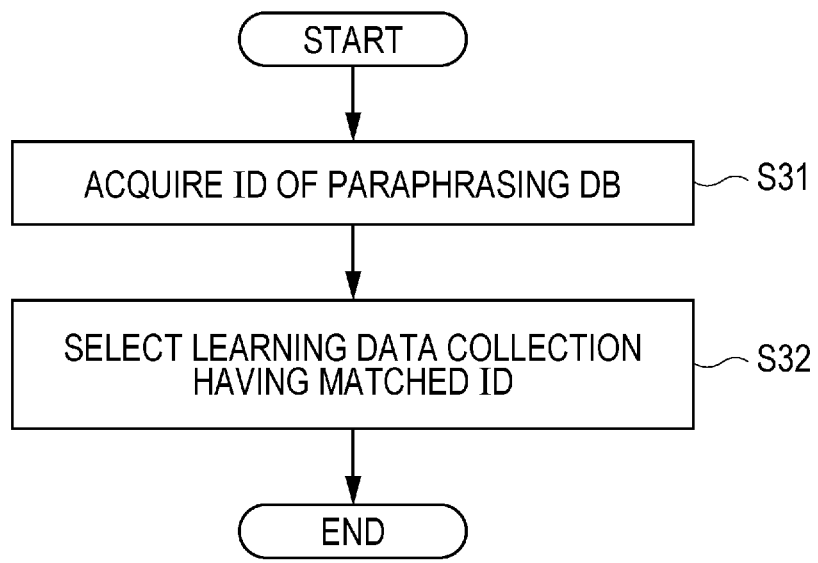
FIG. 8 is a flowchart that illustrates an action of a learning data selection unit in the paraphrasing sentence identification unit.
Figure 9:
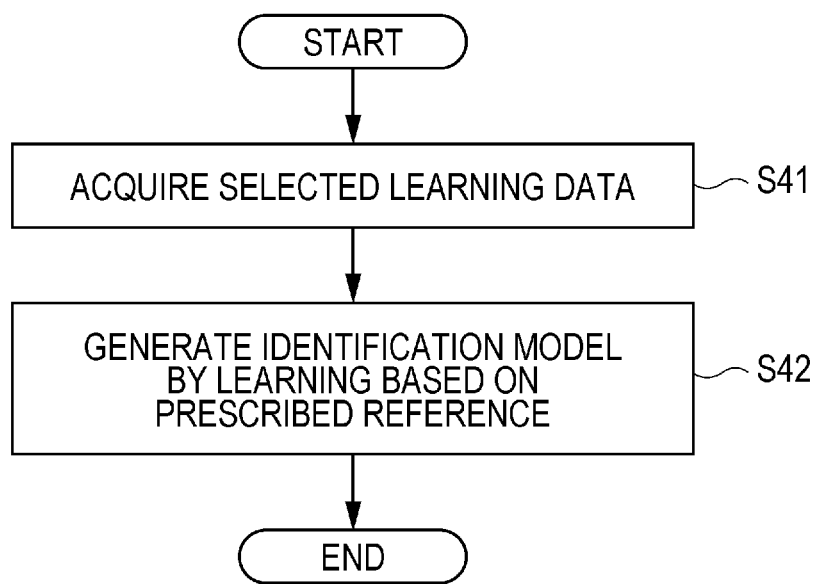
FIG. 9 is a flowchart that illustrates an action of a model generation unit in the paraphrasing sentence identification unit.
Figure 10:
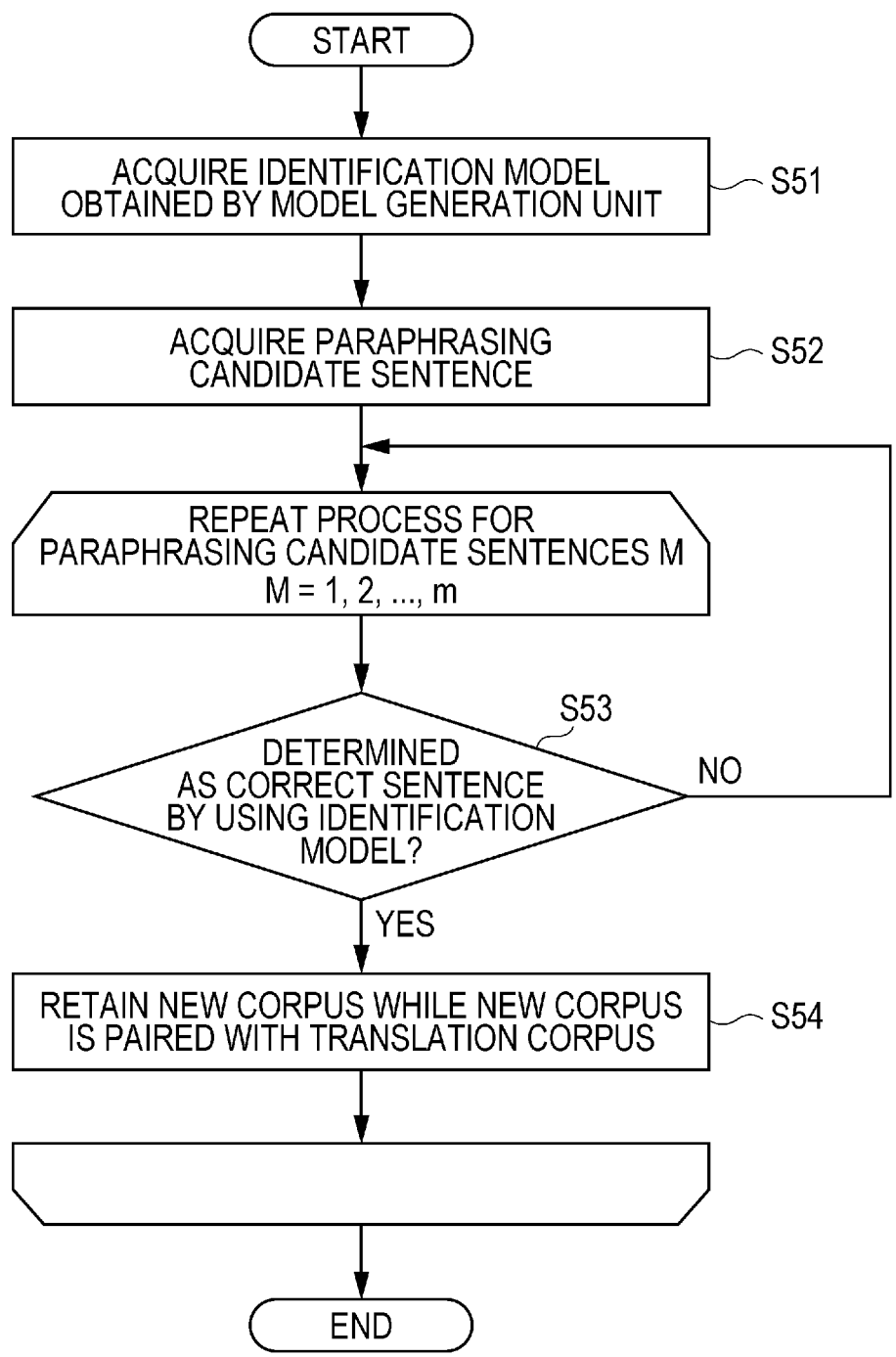
FIG. 10 is a flowchart that illustrates an action of an identification unit in the paraphrasing sentence identification unit.
Figure 12:
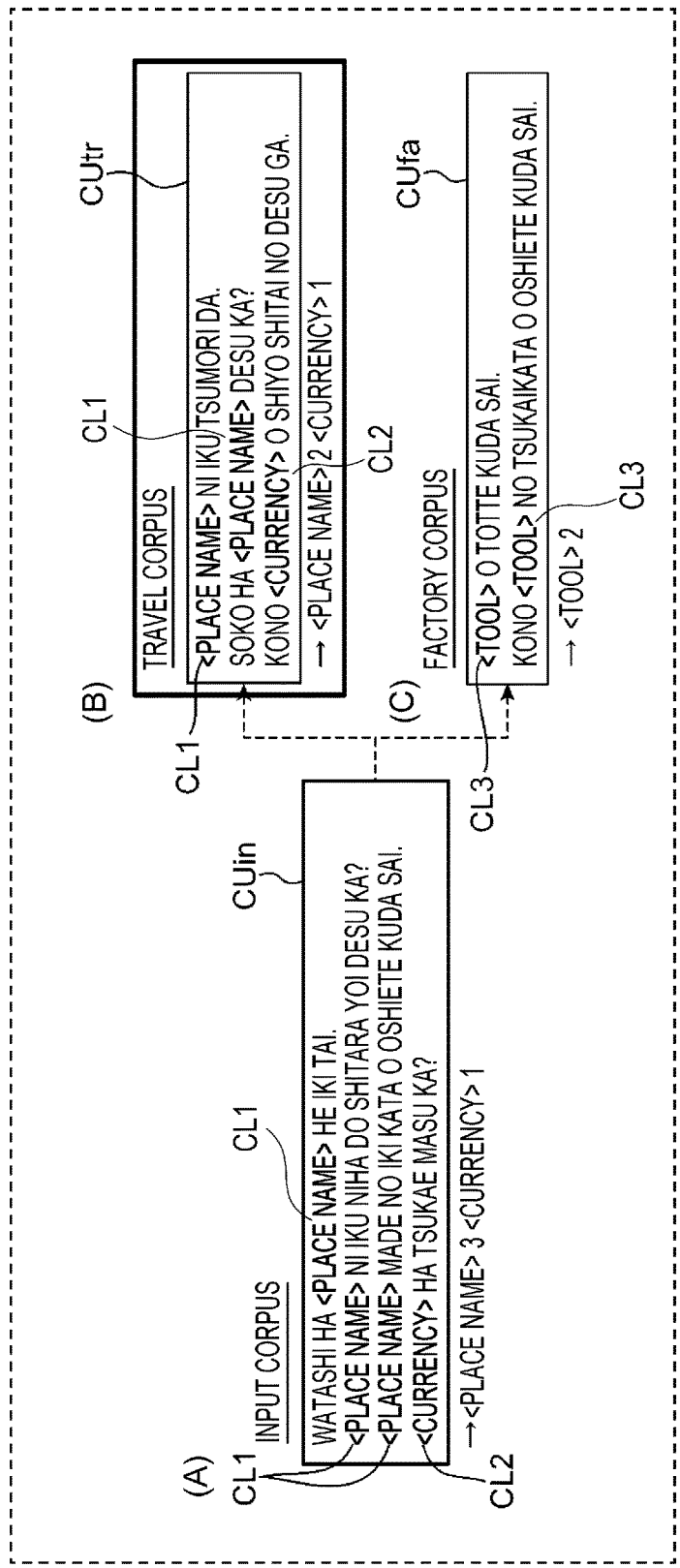
FIG. 12 is a diagram for explaining a selection method of a second mode of the paraphrasing database and the learning data collection.
Figure 13:
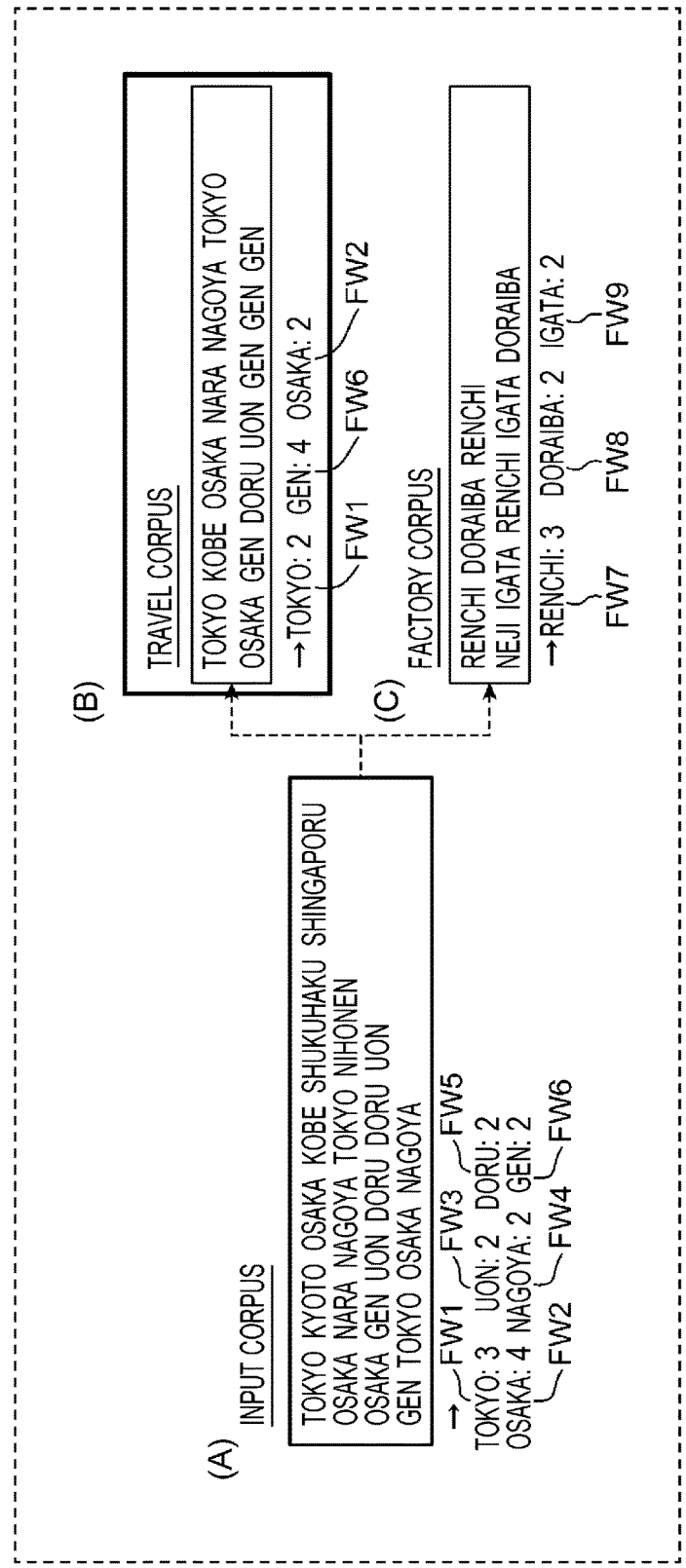
FIG. 13 is a diagram for explaining a selection method of a third mode of the paraphrasing database and the learning data collection.
Figure 14:
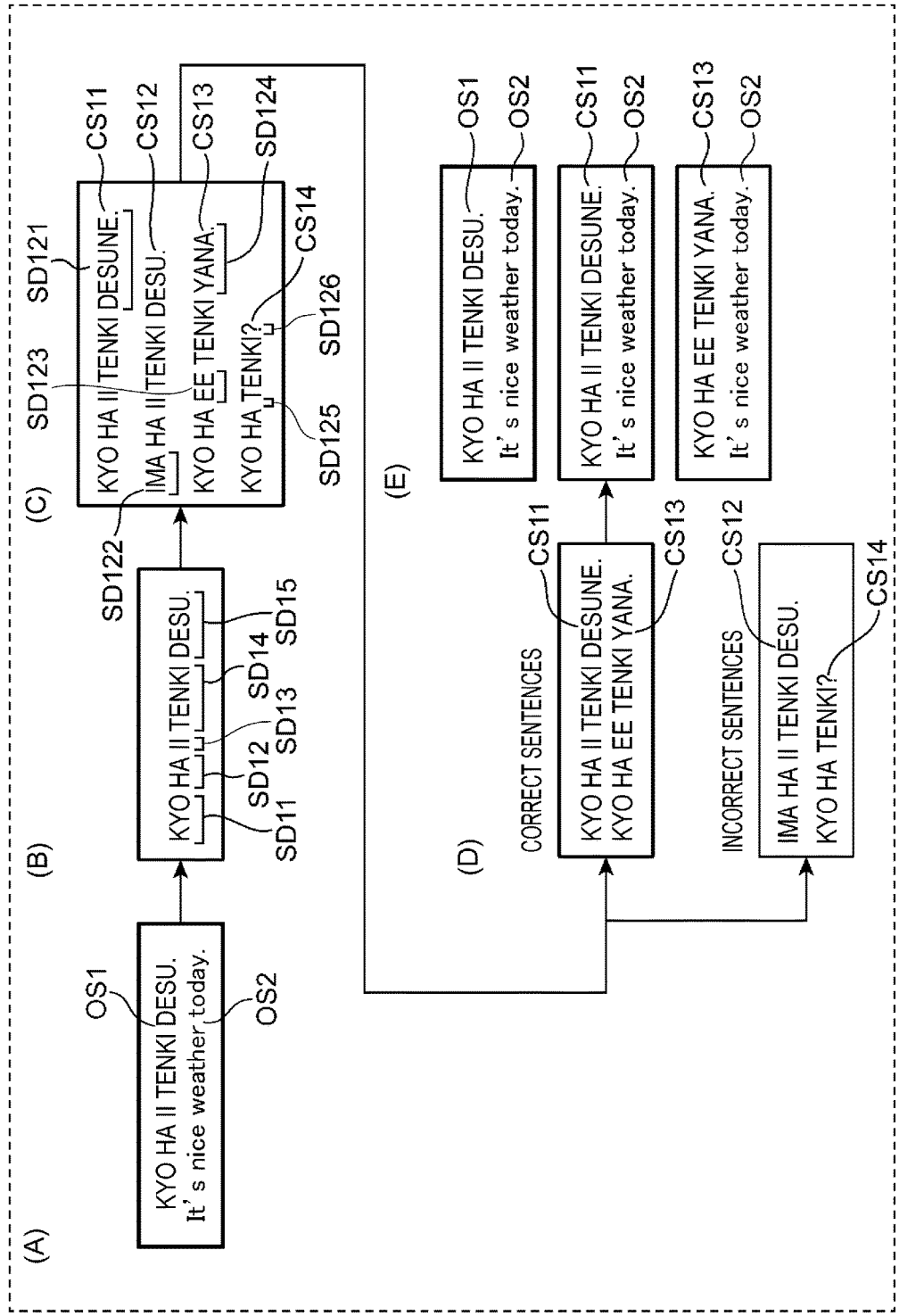
FIG. 14 is a diagram for explaining creation of a translation corpus by using one specific example.

Next, a description will be made about actions of the translation corpus creation device M in this embodiment. FIG. 6 is a flowchart that illustrates an action of the paraphrasing database selection unit in the paraphrasing candidate sentence generation unit. FIG. 7 is a flowchart that illustrates an action of the paraphrasing unit in the paraphrasing candidate sentence generation unit. FIG. 8 is a flowchart that illustrates an action of the learning data selection unit in the paraphrasing sentence identification unit. FIG. 9 is a flowchart that illustrates an action of the model generation unit in the paraphrasing sentence identification unit. FIG. 10 is a flowchart that illustrates an action of the identification unit in the paraphrasing sentence identification unit. FIGS. 11A and 11B are diagrams for explaining the selection method of the first mode of the paraphrasing database and the learning data collection. FIG. 11A illustrates a case where a language model of an input corpus is used, and FIG. 11B illustrates a case where the language model of the input corpus is not used. FIG. 12 is a diagram for explaining the selection method of the second mode of the paraphrasing database and the learning data collection. FIG. 13 is a diagram for explaining the selection method of the third mode of the paraphrasing database and the learning data collection. FIG. 14 is a diagram for explaining creation of the translation corpus by using one specific example. FIG. 14(A) indicates a pair of sentences that are the first and second original sentences included in the input corpus as one example, FIG. 14(B) indicates the fragments of the first original sentence indicated in FIG. 14(A), FIG. 14(C) indicates four paraphrasing candidate sentences for the first original sentence indicated in FIG. 14(A), FIG. 14(D) indicates two paraphrasing candidate sentences that are determined as the same as the meaning of the first original sentence indicated in FIG. 14(A) (correct sentences) and two paraphrasing candidate sentences that are not determined as the same as the meaning of the first original sentence indicated in FIG. 14(A) (incorrect sentences), and FIG. 14(E) indicates the translation corpora that are created for the first original sentence indicated in FIG. 14(A).

The translation corpus creation device M in this embodiment in general creates the translation corpus by following actions. First, the input unit 1 receives the first original sentence in the first language and the second original sentence that is the first original sentence which is translated into the second language different from the first language (reception step). Next, the paraphrasing candidate sentence generation unit 2 paraphrases one or plural fragments, which are included in the first original sentence which is received by the input unit 1 in the reception step, into other expressions in the first language and thereby generates plural paraphrasing candidate sentences for the first original sentence (paraphrasing candidate sentence generation step). Next, the paraphrasing sentence identification unit 3a identifies one or plural paraphrasing candidate sentences in the same meaning as the meaning of the first original sentence from the plural paraphrasing candidate sentences that are generated by the paraphrasing candidate sentence generation unit 2 in the paraphrasing candidate sentence generation step as one or plural paraphrasing sentences (paraphrasing sentence identification step). Next, the translation corpus creation unit 4 generates a new pair of sentences by setting one or plural paraphrasing sentences that are identified by the paraphrasing sentence identification unit 3a in the paraphrasing sentence identification step and the second original sentence that is received in the reception step as a pair of sentences, and creates a new translation corpus with the generated and new pair of sentences, or creates (updates) a translation corpus by adding the generated and new pair of sentences to the existing translation corpus (translation corpus creation step). Then, this created translation corpus is stored in the translation corpus storage unit 5. A more detailed description will be made below with reference to the drawings.

<Reception of Input Corpus and Selection of Paraphrasing DB>

The translation corpus creation device M in this embodiment first executes an action of receiving the input corpus and executes an action of selecting the paraphrasing DB. In FIG. 6, in a reception action of the input corpus and a selection action of the paraphrasing DB, the translation corpus creation device M first receives the input corpus by the input unit 1 and acquires the input corpus (S11). The input corpus is a corpus in which plural N pairs of sentences in which plural N first original sentences in the first language that are mutually different are respectively paired with plural second original sentences that are the plural N first original sentences translated into the second language are collected (N is a positive integer). Although the first and second original sentences may be input one by one from the input unit 1 to the translation corpus creation device M, in this embodiment, the input corpus in which plural first and second original sentences are collected are used, and thereby the plural first and second original sentences are collectively and highly efficiently input from the input unit 1 to the translation corpus creation device M.

Next, the translation corpus creation device M selects the paraphrasing DB that is close to the input corpus based on a prescribed reference (selection method) by the paraphrasing candidate sentence generation unit 2 (S12). More specifically, the paraphrasing DB selection unit 22 of the paraphrasing candidate sentence generation unit 2 selects the paraphrasing DB that corresponds to the plural first original sentences in the input corpus received by the input unit 1 from the plural paraphrasing DBs stored in the paraphrasing DB storage unit 21 in accordance with a prescribed selection method.

The selection methods of the above first to third modes and so forth may be used as the prescribed selection method. The selection methods of the modes will be described below more in detail.

As described above, the selection method of the first mode is a method that selects the paraphrasing DB which has the closest language model from the plural paraphrasing DBs. In the selection method of the first mode, first, each language model is in advance created for each classification of the paraphrasing DBs stored in the paraphrasing DB storage unit 21. Because each of the language models is created for each of the classifications, the language model that accurately reflects the classification may be created for each of the classifications, and a further appropriate paraphrasing DB may thereby be selected. In order to create each of the language models, a corpus is prepared for each of the classifications of the paraphrasing DBs. Each of the corpora may be created by collecting correct sentences in each of the learning data collections that is prepared for each of the classifications as described above. Subsequently, in the selection method of the first mode, two methods of 1A mode and 1B mode described next are raised, for example.

In the 1A mode, the paraphrasing DB selection unit 22 obtains, for each of the classifications of the paraphrasing DBs, the language model of the first original sentence received by the input unit 1 by the language model that is created for each of the classifications of the paraphrasing DBs. Then, the paraphrasing DB selection unit 22 performs comparison of the language model of the first original sentence that is obtained for each of the classifications of the paraphrasing DBs and selects the closest language model.

In this embodiment, because the plural first original sentences are present as the input corpus, the paraphrasing DB selection unit 22 executes above-described processes for each of the plural first original sentences in the input corpus received by the input unit 1 and finally selects the language model that is most frequently selected as the closest language model. Alternatively, the paraphrasing DB selection unit 22 obtains, for each of the classifications of the paraphrasing DBs, the language model of the first original sentence received by the input unit 1 by the language model that is created for each of the classifications of the paraphrasing DBs and obtains the average value for each of the classifications of the paraphrasing DBs. Then, the paraphrasing DB selection unit 22 performs comparison of the average value that is obtained for each of the classifications of the paraphrasing DBs and finally selects the closest language model.

Then, the paraphrasing DB selection unit 22 selects the paraphrasing DB that corresponds to the selected language model.

In the 1B mode, because the plural first original sentences are present as the input corpus, the paraphrasing DB selection unit 22 first creates the language model of the input corpus received by the input unit 1. Next, the paraphrasing DB selection unit 22 obtains, for each of the classifications of the paraphrasing DBs, the language model of the first original sentence with respect to each of the plural first original sentences in the input corpus that is received by the input unit 1 by the language model that is created for each of the classifications of the paraphrasing DBs. Then, the paraphrasing DB selection unit 22 selects the closest language model to the language model of the input corpus. More specifically, the paraphrasing DB selection unit 22 compares the language model of the input corpus with the language model that is obtained for each of the classifications of the paraphrasing DBs with respect to each of the plural first original sentences in the input corpus that is received by the input unit 1, selects the closest language model, and finally selects the language model that is most frequently selected as the closest language model to the language model of the input corpus. Then, the paraphrasing DB selection unit 22 selects the paraphrasing DB that corresponds to the selected language model. The selection method of the 1B mode creates the language model of the input corpus as a reference for comparison among each of classifications of the paraphrasing DBs. Thus, compared to the selection method of the 1A mode, the classification of the paraphrasing DB (that is, the paraphrasing DB) that is closer to the input corpus may be selected from each of the classifications of the paraphrasing DBs.

The language model may be an arbitrary model as long as comparison is possible among the language models. Here, a description will be made about examples of the 1A and 1B modes in a case where an n-gram language model is used with reference to FIGS. 11A and 11B. FIG. 11A illustrates a case of the 1B mode, and FIG. 11B illustrates a case of the 1A mode.

The n-gram language model has been known as one of statistical language models and obtains the appearance probability of N words. For example, in a case where the language model for the paraphrasing DB for travel (the language model for travel) is created, a travel corpus in which plural sentences which are used related to travel are collected is first prepared. Next, the appearance probability of the n-gram is obtained while the travel corpus is set as the population. Accordingly, the language model for travel is created. Such creation of the language model is executed for each of the classifications of the paraphrasing DBs, and the language model is created for each of the classifications of the paraphrasing DBs.

In the selection method of the 1B mode, after such a preparation, the language model of the input corpus is created. With respect to each of the plural first original sentences in the input corpus, the language model of the first original sentence is obtained, for each of the classifications of the paraphrasing DBs, by the language model that is created for each of the classifications of the paraphrasing DBs. Examples of the results are illustrated in FIG. 11A. The language model of the first original sentence is obtained by obtaining the n-gram included in the first original sentence and by multiplication of all the appearance probabilities of the obtained n-gram. Then, the paraphrasing DB selection unit 22 selects the closest language model to the language model of the input corpus. In the example illustrated in FIG. 11A, as for the language model of the input corpus, in a case where the probability values are compared between the language model for travel and the language model for traffic with respect to each of the plural first original sentences, the language model for travel has more first original sentences with the probability values that are determined as close to the language model of the input corpus. Thus, the language model for travel is selected, and the paraphrasing DB for travel is selected.

Meanwhile, in the selection method of the 1A mode, after the above-described preparation, with respect to each of the plural first original sentences in the input corpus, the language model of the first original sentence is obtained, for each of the classifications of the paraphrasing DBs, by the language model that is created for each of the classifications of the paraphrasing DBs. Examples of the results are illustrated in FIG. 11B. Then, the paraphrasing DB selection unit 22 selects the closest language model to the input corpus. In the example illustrated in FIG. 11B, in a case where the probability values are compared between the language model for travel and the language model for traffic with respect to each of the plural first original sentences, the language model for travel has more first original sentences with larger probability values than the language model for traffic. Thus, the language model for travel is selected, and the paraphrasing DB for travel is selected. As described above, the average values of the probability values may be compared.

As described above, the selection method of the second mode is a method that selects the paraphrasing DB which is in the most similar class from the plural paraphrasing DBs. Classing is grouping words by a common attribute, and a class is a name that is provided for the group. For example, a meaning class is the name of a group that is formed by grouping by the meanings of words. In one example, <place name> class is the name of the group formed with words that represent place names. In another example, <currency> class is the name of the group formed with words that represent currencies. For example, a part-of-speech class is the name of a group that is formed by grouping by the parts of speech of words. In one example, <noun> class is the name of the group formed with noun words. In another example, <verb> class is the name of the group formed with verb words.

In the selection method of the second mode, more specifically, the paraphrasing DB selection unit 22 first extracts the class that is included in the first original sentence received by the input unit 1. Next, the paraphrasing DB selection unit 22 extracts and counts the same classes as the extracted class that is included in the first original sentence from each of the paraphrasing DBs or each corpus that is in advance prepared for each of the classifications of the paraphrasing DBs. In a case where plural classes are included in the first original sentence, count is performed for each of the classes. Then, the paraphrasing DB selection unit 22 selects the closest paraphrasing DB to the first original sentence based on the count results. For example, the paraphrasing DB with the largest count value is selected. Further, for example, the paraphrasing DB that includes the most same classes as the classes which are included in the first original sentence is selected. Further, for example, the paraphrasing DB with the largest count value is selected with respect to each of the classes, and the paraphrasing DB that is most frequently selected is selected.

In this embodiment, because the plural first original sentences are present as the input corpus, the paraphrasing DB selection unit 22 executes above-described processes for each of the plural first original sentences in the input corpus received by the input unit 1 and finally selects the paraphrasing DB that is most frequently selected as the closest paraphrasing DB. Alternatively, the above-described processes may collectively be executed for plural first original sentences in the input corpus that is received by the input unit 1. More specifically, the paraphrasing DB selection unit 22 extracts the classes that are included in the plural first original sentences in the input corpus that is received by the input unit 1. Next, the paraphrasing DB selection unit 22 extracts and counts the same classes as the extracted classes that are included in the plural first original sentences from each of the paraphrasing DBs or each corpus that is in advance prepared for each of the classifications of the paraphrasing DBs. In a case where plural classes are included in the first original sentences, count is performed for each of the classes. Then, the paraphrasing DB selection unit 22 selects the closest paraphrasing DB to the plural first original sentences (that is, the input corpus) based on the count results. For example, the paraphrasing DB with the largest count value is selected. Further, for example, the paraphrasing DB that includes the most same classes as the classes which are included in the plural first original sentences is selected. Further, for example, the paraphrasing DB with the largest count value is selected with respect to each of the classes, and the paraphrasing DB that is most frequently selected is selected.

In one specific example, for example, as illustrated in FIG. 12(A), two kinds of classes that are a <place name> class CL1 and a <currency> class CL2 are extracted from four first original sentences in an input corpus CUin. The input corpus CUin includes three <place name> classes CL1 and one <currency> class CL2. As illustrated in FIG. 12(B), a travel corpus CUtr includes two <place name> classes CL1 and one <currency> class CL2. Meanwhile, as illustrated in FIG. 12(C), a factory corpus CUfa does not include the <place name> class CL1 or the <currency> class CL2 but includes two <tool> classes CL3 instead. Thus, the travel corpus CUtr is selected, and the paraphrasing DB for travel is selected.

As described above, the selection method of the third mode is a method that selects the paraphrasing DB which has the most similar frequent vocabularies or unique vocabularies from the plural paraphrasing DBs. The unique vocabularies are in advance set.

In the selection method of the third mode, more specifically, the paraphrasing DB selection unit 22 first extracts the unique vocabulary that is included in the first original sentence received by the input unit 1. In the extraction of the unique vocabulary, the morpheme analysis or the like that divides a sentence of a natural language into strings of the morphemes (in one example, the minimum unit that has a meaning in the language) is preferably executed before the extraction, for example. Next, the paraphrasing DB selection unit 22 extracts and counts the same vocabulary as the extracted unique vocabulary that is included in the first original sentence from each of the paraphrasing DBs or each corpus that is in advance prepared for each of the classifications of the paraphrasing DBs. In a case where plural unique vocabularies are included in the first original sentence, count is performed for each of the unique vocabularies. Then, the paraphrasing DB selection unit 22 selects the closest paraphrasing DB to the first original sentence based on the count results. For example, the paraphrasing DB with the largest count value is selected. Further, for example, the paraphrasing DB that includes the most same unique vocabularies as the unique vocabularies which are included in the first original sentence is selected. Further, for example, the paraphrasing DB with the largest count value is selected with respect to each of the unique vocabularies, and the paraphrasing DB that is most frequently selected is selected.

In this embodiment, because the plural first original sentences are present as the input corpus, the paraphrasing DB selection unit 22 executes above-described processes for each of the plural first original sentences in the input corpus received by the input unit 1 and finally selects the paraphrasing DB that is most frequently selected as the closest paraphrasing DB. In this case, instead of the unique vocabulary, a frequent vocabulary may be extracted from the input corpus, and the extracted frequent vocabulary may thereby be used. The frequent vocabulary is a vocabulary that appears at a frequency of a preset threshold value (frequency threshold value) or more in the input corpus, for example. The frequency threshold value is set to an appropriate value by using plural samples in order to preferably select 2, 3, 5, or 10 paraphrasing DBs or the like, for example. Further, for example, appearance frequencies may be totaled with respect to each vocabulary, and the vocabularies whose appearance frequencies are in the highest 20% may be set as the frequent vocabularies. Alternatively, above-described processes may collectively be executed for plural first original sentences in the input corpus that is received by the input unit 1. More specifically, the paraphrasing DB selection unit 22 extracts the unique vocabulary (or frequent vocabulary) that is included in the plural first original sentences in the input corpus that is received by the input unit 1. Next, the paraphrasing DB selection unit 22 extracts and counts the same unique vocabulary (or frequent vocabulary) as the extracted unique vocabulary (or frequent vocabulary) that is included in the plural first original sentences from each of the paraphrasing DBs or each corpus that is in advance prepared for each of the classifications of the paraphrasing DBs. In a case where plural unique vocabularies (or frequent vocabularies) are included in the first original sentences, count is performed for each of the unique vocabularies (or frequent vocabularies). Then, the paraphrasing DB selection unit 22 selects the closest paraphrasing DB to the plural first original sentences (that is, the input corpus) based on the count results. For example, the paraphrasing DB with the largest count value is selected. Further, for example, the paraphrasing DB that includes the most same unique vocabularies (or frequent vocabularies) as the unique vocabularies (or frequent vocabularies) which are included in the plural first original sentences is selected. Further, for example, the paraphrasing DB with the largest count value is selected with respect to each of the unique vocabularies (or frequent vocabularies), and the paraphrasing DB that is most frequently selected is selected.

In one specific example, for example, the morpheme analysis is performed for the input corpus, which is not illustrated, nouns are extracted, and the nouns that appear two times or more are extracted as the frequent vocabularies from the extracted nouns. Extraction results of nouns and the frequent vocabularies are illustrated in FIG. 13(A). In the input corpus, a frequent vocabulary FW1 appears three times, a frequent vocabulary FW2 appears four times, a frequent vocabulary FW3 appears two times, a frequent vocabulary FW4 appears two times, a frequent vocabulary FW5 appears two times, and a frequent vocabulary FW6 appears two times. The morpheme analysis is performed for a travel corpus, which is not illustrated, nouns are extracted, and the nouns that appear two times or more are extracted as the frequent vocabularies from the extracted nouns. Extraction results of nouns and the frequent vocabularies are illustrated in FIG. 13(B). Similarly, the morpheme analysis is performed for a factory corpus, which is not illustrated, nouns are extracted, and the nouns that appear two times or more are extracted as the frequent vocabularies from the extracted nouns. Extraction results of nouns and the frequent vocabularies are illustrated in FIG. 13(C). As a result, in the travel corpus, the frequent vocabulary FW1 appears two times, the frequent vocabulary FW6 appears two times, and the frequent vocabulary FW2 appears two times. On the other hand, in the factory corpus, the frequent vocabularies FW1 to FW6 do not appear. In the factory corpus, a frequent vocabulary FW7 appears three times, a frequent vocabulary FW8 appears two times, and a frequent vocabulary FW9 appears two times. Thus, the travel corpus is selected, and the paraphrasing DB for travel is selected.

Returning to FIG. 6, the translation corpus creation device M next acquires the ID provided for the paraphrasing DB that is selected in process S12 by the paraphrasing DB selection unit 22 of the paraphrasing candidate sentence generation unit 2, outputs the acquired ID to the paraphrasing sentence identification unit 3a (S13), and finishes the reception action of the input corpus and the selection action of the paraphrasing DB.

By such actions, the translation corpus creation device M receives the input corpus by the input unit 1 and selects the paraphrasing DB that corresponds to the input corpus received by the input unit 1.

<Generation of Paraphrasing Candidate Sentence>

Next, the translation corpus creation device M in this embodiment executes an action of generating the paraphrasing candidate sentence. In FIG. 7, in a generation action of the paraphrasing candidate sentence, the translation corpus creation device M first acquires the paraphrasing DB, which is selected by above-described processes S11 to S13, from the paraphrasing DB storage unit 21 by the paraphrasing unit 23 of the paraphrasing candidate sentence generation unit 2 (S21).

Next, the translation corpus creation device M performs following processes S22 and S23 for all plural N first original sentences in the input corpus that is received by the input unit 1 (N is a positive integer).

In process S22, the translation corpus creation device M determines whether or not there is a fragment that matches the first fragment of the selected paraphrasing DB in plural fragments that are included in the first original sentence in the input corpus received by the input unit 1, by the paraphrasing unit 23. As a result of the determination, in a case where there is the matched fragment, the matched fragment that is included in the first original sentence is paraphrased by replacing the matched fragment by the second fragment that is associated with the first fragment in the paraphrasing DB (S22). Accordingly, one paraphrasing candidate sentence is generated for the first original sentence.

In process S23, the translation corpus creation device M determines whether or not the first original sentence processed in above process S22 may still be paraphrased by replacement of fragments, by the paraphrasing unit 23. As a result of the determination, in a case where paraphrasing is possible by the replacement (Yes), processing is returned to process S22. On the other hand, in a case where paraphrasing is not possible by the replacement (No), the processing for the generation action of the paraphrasing candidate sentence is finished. In a case where the processing is returned to process S22 in process S23, another paraphrasing candidate sentence is further generated for the first original sentence. As a result, plural paraphrasing candidate sentences are generated for the first original sentence. Note that the paraphrasing frequency may be limited. That is, in a case where the paraphrasing frequency reaches a limit value even if paraphrasing is possible, the generation action of the paraphrasing candidate sentence is finished. The limit value of the paraphrasing frequency may be an arbitrary value that includes one time.

A description will be made with one specific example with reference to FIG. 14. In FIG. 14, as illustrated in FIG. 14(A), the input corpus includes a first original sentence OS1 in the first language and a second original sentence OS2 that is the first original sentence translated into the second language. As illustrated in FIG. 14(B), the first original sentence OS1 is configured with five fragments SD11 to SD15. In the paraphrasing DB that is selected by above-described processes S11 to S13, as described below, a first fragment SD11k and a second fragment SD12k are mutually associated (k is an integer of one to six in this example). A second fragment SD122 (see FIG. 14(C)) is associated with a first fragment SD111 (not illustrated) that matches the fragment SD11 (SD11=SD111) (SD111⇔SD122). A second fragment SD123 (see FIG. 14(C)) is associated with a first fragment SD112 (not illustrated) that matches the fragment SD13. In addition, a second fragment SD125 (see FIG. 14(C)) as null (null value) is associated with a first fragment SD115 (not illustrated) that matches the fragment SD13 (SD13=SD115) (SD115⇔SD125). A second fragment SD121 (see FIG. 14(C)) is associated with the first fragment SD111 (not illustrated) that matches the fragment SD15 (SD15=SD111) (SD111⇔SD121). In addition, a second fragment SD124 (see FIG. 14(C)) is associated with the first fragment SD114 (not illustrated) that matches the fragment SD15 (SD15=SD114) (SD114⇔SD124). In addition, a second fragment SD126 (see FIG. 14(C)) is associated with the first fragment SD116 (not illustrated) that matches the fragment SD15 (SD15=SD116) (SD116⇔SD126).

In such a case, as illustrated in FIGS. 14(B) and 14(C), in the first original sentence OS1, paraphrasing is performed by replacing the fragment SD15 by the second fragment SD121 by processes S22 and S23, and a paraphrasing candidate sentence CS11 is generated from the first original sentence OS1. Paraphrasing is performed by replacing the fragment SD11 by the second fragment SD122 by next processes S22 and S23, and a paraphrasing candidate sentence CS12 is generated from the first original sentence OS1. Paraphrasing is performed by respectively replacing the fragments SD13 and SD15 by the second fragments SD123 and SD124 by next processes S22 and S23, and a paraphrasing candidate sentence CS13 is generated from the first original sentence OS1. Then, paraphrasing is performed by respectively replacing the fragments SD13 and SD15 by the second fragments SD125 and SD126 by next processes S22 and S23, and a paraphrasing candidate sentence CS14 is generated from the first original sentence OS1. As described above, four paraphrasing candidate sentences CS11 to CS14 are generated from one first original sentence OS1.

By such an action, the translation corpus creation device M generates plural paraphrasing candidate sentences for each of the plural first original sentences in the input corpus that is received by the input unit 1.

<Selection of Learning Data Collection>

Next, the translation corpus creation device M in this embodiment executes an action of selecting the learning data collection. In FIG. 8, in a selection action of the learning data collection, the translation corpus creation device M first acquires the ID of the paraphrasing DB, which is acquired by the paraphrasing DB selection unit 22 in above-described process S13, from the paraphrasing DB selection unit 22 by the learning data selection unit 32a of the paraphrasing sentence identification unit 3a (S31).

Then, the translation corpus creation device M selects the learning data collection that has the ID acquired in this process S31 from the plural learning data collections that are stored in the learning data storage unit 31a, by the learning data selection unit 32a (S32) and finishes the processing for the selection action of the learning data collection.

By such an action, the translation corpus creation device M selects the learning data collection that corresponds to the input corpus received by the input unit 1.

In the above description, the same ID is provided for the paraphrasing DB and the learning data collection in the same classification that are mutually associated, and the learning data collection is selected based on the ID of the paraphrasing DB that is selected in the selection action of the paraphrasing DB. However, the ID may not be used, and the learning data collection that corresponds to the input corpus received by the input unit 1 may thereby be selected from the plural learning data collections that are stored in the learning data storage unit 31a by similar processes to the selection action of the paraphrasing DB.

That is, in a selection method of a first mode, the learning data collection that has the closest language model is selected from the plural learning data collections by similar processes to the selection method of the first mode in the selection action of the paraphrasing DB. In a selection method of a second mode, the learning data collection that is in the most similar class is selected from the plural learning data collections by similar processes to the selection method of the second mode in the selection action of the paraphrasing DB. In a selection method of a third mode, the learning data collection that has the most similar frequent vocabulary or unique vocabulary is selected from the plural learning data collections by similar processes to the selection method of the third mode in the selection action of the paraphrasing DB.

Here, in the selection action of the learning data collection, a selection method of the next fourth mode may further be selected. The selection method of the fourth mode is a method that selects the learning data collection which has the most similar sentence length from the plural learning data collections. The sentence length is the total number of characters, for example. Further, for example, the sentence length is the total number of words.

In the selection method of the fourth mode, more specifically, the learning data selection unit 32a first obtains the sentence length of the first original sentence received by the input unit 1. Then, the learning data selection unit 32a obtains the difference from the obtained sentence length of the first original sentence with respect to each of the learning data collections and selects the learning data collection that has the closest sentence length to the obtained sentence length of the first original sentence. In this case, the sentence length of the learning data collection is the sentence length that most frequently appears in the learning data collection, for example. Alternatively, the learning data selection unit 32a obtains the difference between each datum in the learning data collection and the obtained sentence length of the first original sentence and thereby obtains the average difference thereof with respect to each of the learning data collections, and thereby selects the learning data collection that has the least average difference among each of the obtained average differences as the learning data collection that is closest to the sentence length of the first original sentence.

In this embodiment, because the plural first original sentences are present as the input corpus, the learning data selection unit 32a executes above-described processes for each of the plural first original sentences in the input corpus received by the input unit 1 and finally selects the learning data collection that is most frequently selected as the closest learning data collection. Alternatively, the learning data selection unit 32a obtains the sentence length of the input corpus received by the input unit 1, obtains the difference from the obtained sentence length of the input corpus with respect to each of the learning data collections, and selects the learning data collection that has the closest sentence length to the obtained sentence length of the input corpus. In this case, the sentence length of the input corpus is the sentence length that most frequently appears in the input corpus, for example.

<Generation of Identification Model>

Next, the translation corpus creation device M in this embodiment executes an action of generating the identification model. In FIG. 9, in a generation action of the identification model, the translation corpus creation device M first acquires the learning data collection, which is selected by above-described processes S31 and S32, from the learning data storage unit 31a by the model generation unit 33 of the paraphrasing sentence identification unit 3a (S41).

Next, the translation corpus creation device M generates the identification model by the model generation unit 33 and by the machine learning based on a prescribed reference (feature), based on the learning data collection selected by the learning data selection unit 32a (S42). For example, after the morpheme analysis, the identification model is formed by the deep learning while an appearance frequency of the words or the like such as the n-gram language model or bag-of-words is set as the feature.

By such an action, the translation corpus creation device M generates the identification model in the paraphrasing sentence identification unit 3a.

<Identification of Paraphrasing Sentence and Creation of Translation Corpus>

Next, the translation corpus creation device M in this embodiment executes an action of identifying the paraphrasing sentence from the paraphrasing candidate sentences based on the identification model and then executes an action of creating the translation corpus based on the identification result. In FIG. 10, in an identification action of the paraphrasing sentence and a creation action of the translation corpus, the translation corpus creation device M first acquires the identification model, which is generated by the model generation unit 33, by the identification unit 34 of the paraphrasing sentence identification unit 3a (S51).

Next, the translation corpus creation device M acquires the plural paraphrasing candidate sentences, which are generated by above-described processes S21 to S23, by the identification unit 34 (S52).

Next, the translation corpus creation device M performs following process S53 for all plural M paraphrasing candidate sentences that are acquired by this process S52 (M is a positive integer).

In this process S53, the translation corpus creation device M determines whether or not the paraphrasing candidate sentence is a correct sentence as a sentence in the same meaning based on the identification model that is generated by above-described processes S41 and S42 and is acquired by process S51. As a result of the determination, in a case where a determination is made that the paraphrasing candidate sentence is a correct sentence as a sentence in the same meaning (Yes), the identification unit 34 sets the paraphrasing candidate sentence that is a determination target as the paraphrasing sentence. On the other hand, in a case where a determination is made that the paraphrasing candidate sentence is not in the same meaning or not a correct sentence (No), the identification unit 34 does not set the paraphrasing candidate sentence that is a determination target as the paraphrasing sentence.

For example, in one specific example illustrated in FIG. 14, process S53 is performed for each of the four paraphrasing candidate sentences CS11 to CS14 that are indicated in FIG. 14(C). Consequently, as illustrated in FIG. 14(D), the two paraphrasing candidate sentences CS11 and CS13 are determined as correct sentences in the same meaning and set as the paraphrasing sentences. However, the two paraphrasing candidate sentences CS12 and CS14 are determined as not in the same meaning or not correct sentences.

By such processes, the identification unit 34 identifies one or plural paraphrasing candidate sentences in the same meaning as the meaning of the first original sentence from the plural paraphrasing candidate sentences that are generated by the paraphrasing candidate sentence generation unit 2 as one or plural paraphrasing sentences based on the identification model that is generated by the model generation unit 33.

Next, the translation corpus creation device M creates a new corpus by the translation corpus creation unit 4 based on the identification results of above-described process S53, stores the created and new corpus in the translation corpus storage unit 5 while the created and new corpus is paired (associated) with the existing translation corpus that is stored in the translation corpus storage unit 5, thereby creates the translation corpus (S54), and finishes the identification action of the paraphrasing sentence and the creation action of the translation corpus. More specifically, the translation corpus creation unit 4 generates a new pair of sentences by setting one or plural paraphrasing sentences that are identified by above-described process S53 and the second original sentence that is received in above-described process S11 as a pair of sentences. For example, in one specific example illustrated in FIG. 14, the paraphrasing candidate sentence CS11 that is determined as a correct sentence, set as the paraphrasing sentence, and indicated in FIG. 14(D) and the second original sentence OS2 indicated in FIG. 14(A) are set as a new pair of sentences as illustrated in the middle part of FIG. 14(E). The paraphrasing candidate sentence CS13 that is determined as a correct sentence, set as the paraphrasing sentence, and indicated in FIG. 14(D) and the second original sentence OS2 indicated in FIG. 14(A) are set as a new pair of sentences as illustrated in the lower part of FIG. 14(E). In the above description, a new pair is made in a one-to-one manner. However, the paraphrasing candidate sentences CS11 and CS13 that are set as the paraphrasing sentences and the second original sentence OS2 may be made a new pair of sentences in a multiple-to-one manner. Further, such processes are executed for each of plural N first original sentences and second original sentences in the input corpus, and plural new pairs of sentences that correspond to the plural N first original sentences and second original sentences in the input corpus are collected and set as the new corpus. Note that the input corpus itself may be included in the new corpus. Then, the translation corpus creation unit 4 stores the new corpus that is created as described above in the translation corpus storage unit 5 while the created and new corpus is paired (associated) with the existing translation corpus that is stored in the translation corpus storage unit 5, and thereby creates the translation corpus. In a case where an existing translation corpus is not stored in the translation corpus storage unit 5, the translation corpus creation unit 4 may store the new translation corpus that is created as described above in the translation corpus storage unit 5 as a new translation corpus.

By such an action, the translation corpus creation device M creates the translation corpus.

As described above, the translation corpus creation device M in this embodiment and the translation corpus creation method and translation corpus creation program that are implemented in the translation corpus creation device M may automatically generate a paraphrasing sentence and create a translation corpus that accumulates more pairs of sentences. Accordingly, the translation corpus creation device M, the translation corpus creation method, and the translation corpus creation program may improve creation of a translation corpus. Particularly, a relatively high cost is usually requested for creation of the translation corpus that accumulates more pairs of sentences because work and time are requested for collection of pairs of sentences. However, as described above, the translation corpus creation device M, the translation corpus creation method, and the translation corpus creation program may automatically generate sentences, thus suppress the increase in the cost, and reduce a unit price that is requested for collection of one pair of sentences.

Here, Japanese Unexamined Patent Application Publication No. 2006-190072 suggests a technique related to an automatic paraphrasing device, an automatic paraphrasing method, and a paraphrasing processing program for converting (paraphrasing) an original expression that is used for preprocessing of a machine translation device and is input, for example, into another expression that is in the same meaning and preferable for subsequent processing. More specifically, an automatic paraphrasing device that is disclosed in Japanese Unexamined Patent Application Publication No. 2006-190072 includes: an expression fragment storage unit that stores expression fragments which appear in a first usage example sentence group in a prescribed language with an appearance degree of each of the expression fragments in the first usage example sentence group; a paraphrasing sentence storage unit that stores one or plural paraphrasing sentences for each of the usage example sentences in a second usage example sentence group in the prescribed language with paraphrasing information which indicates a paraphrasing mode in a case of obtaining the paraphrasing sentence; a paraphrasing information storage unit that stores the paraphrasing information which indicates the paraphrasing mode of the usage example sentence in the second usage example sentence group into the paraphrasing sentence with an application frequency of the paraphrasing information; a search unit that receives an original sentence as a paraphrasing target and searches for the paraphrasing sentence which shares at least one of the expression fragments which are stored in the expression fragment storage unit with the original sentence from the paraphrasing sentences which are stored in the paraphrasing sentence storage unit; an evaluation unit that evaluates a validity score which is calculated by a predetermined calculation scheme based on the application frequencies of the pieces of the paraphrasing information which are stored in the paraphrasing information storage unit about paraphrasing from a corresponding original usage example sentence and paraphrasing from the original sentence with respect to each of the paraphrasing sentences which is searched for by the search unit; and an original sentence paraphrasing unit that generates the paraphrasing sentence for the original sentence by applying the paraphrasing information which is associated with the paraphrasing sentence in which the validity score evaluated by the evaluation unit satisfies a prescribed condition to the original sentence in a reverse direction in the paraphrasing sentence storage unit.

As described above, the automatic paraphrasing device disclosed in Japanese Unexamined Patent Application Publication No. 2006-190072 is a device that generates the paraphrasing sentence in which the original expression input to the machine translation device is paraphrased into an expression which is easy for the machine translation device to translate. Thus, the automatic paraphrasing device disclosed in Japanese Unexamined Patent Application Publication No. 2006-190072 generates only one paraphrasing sentence for one input sentence but does not generate plural paraphrasing sentences. In addition, the automatic paraphrasing device disclosed in Japanese Unexamined Patent Application Publication No. 2006-190072 does not add the generated paraphrasing sentence to the translation corpus or does not generate a translation corpus. Accordingly, Japanese Unexamined Patent Application Publication No. 2006-190072 does not disclose or propose the above-described embodiment.

Further, Japanese Unexamined Patent Application Publication No. 2015-118498 suggests a technique for creating a similar sentence for a voice interaction system. More specifically, a device that is disclosed in Japanese Unexamined Patent Application Publication No. 2015-118498 is a device that creates a similar sentence in a same intention and that causes a computer to function as: a seed sentence analyzing unit that detects seed words related to each other in a seed sentence which is an arbitrary same intention sentence; a synonym search unit that searches for one or more synonyms which are similar to the seed word by using a synonym database; a seed word co-occurrence vector calculating unit that refers to an aggregation of the same intention sentences and calculates a seed word co-occurrence vector which is formed with appearance frequencies of context words relevant to the seed word while each of the context words is set as an element of a vector; a synonym co-occurrence vector calculating unit that refers to a large amount of general sentence aggregations and calculates a synonym co-occurrence vector which is formed with the appearance frequencies of the context words relevant to each of the synonyms while each of the context word is set as an element of a vector; a synonym selection unit that compares the seed word co-occurrence vector for the seed word with the synonym co-occurrence vector and selects the synonym of the synonym co-occurrence vector which has a similarity degree of a prescribed threshold or higher; and a similar sentence creation unit that creates a similar sentence in which the seed word and the synonyms co-occur.

As described above, Japanese Unexamined Patent Application Publication No. 2015-118498 is a document about the voice interaction system and does not take machine translation into consideration. Accordingly, Japanese Unexamined Patent Application Publication No. 2015-118498 does not create a translation corpus. Further, because the device disclosed in Japanese Unexamined Patent Application Publication No. 2015-118498 is the device that creates a similar sentence in the same intention, the meaning of the created similar sentence is not necessarily the same as the meaning of an original sentence. Accordingly, Japanese Unexamined Patent Application Publication No. 2015-118498 does not disclose or propose the above-described embodiment.

Further, the translation corpus creation device M, the translation corpus creation method, and the translation corpus creation program select the paraphrasing DB that corresponds to the first original sentence received by the input unit 1 from the plural paraphrasing DBs stored in the paraphrasing DB storage unit 21, generates the plural paraphrasing candidate sentences for the first original sentence based on the selected paraphrasing DB, and may thus generate further preferable paraphrasing candidate sentences for the first original sentence and create a more accurate translation corpus.

Further, the translation corpus creation device M, the translation corpus creation method, and the translation corpus creation program select the learning data collection that corresponds to the first original sentence received by the input unit 1 from the plural learning data collections stored in the learning data storage unit 31a, identifies the one or plural paraphrasing sentences from the plural paraphrasing candidate sentences by the identification model that is generated based on the selected learning data collection, and may thus identify a further preferable paraphrasing sentence for the first original sentence and create a more accurate translation corpus.

In the above-described embodiment, the translation corpus creation device M stores the plural learning data collections that are classified in accordance with the prescribed classification scheme in the learning data storage unit 31a and selects the learning data collection that corresponds to the first original sentence received by the input unit 1 from the plural learning data collections. However, the translation corpus creation device M may not perform the classification but may store one learning data collection formed with plural data that belong to various classifications, select the data that corresponds to the first original sentence received by the input unit 1 from the one learning data collection, and thereby create the learning data collection for actually generating the identification model. The translation corpus creation device M that includes the paraphrasing sentence identification unit of such a modification will be described below more in detail.

Figure 15:
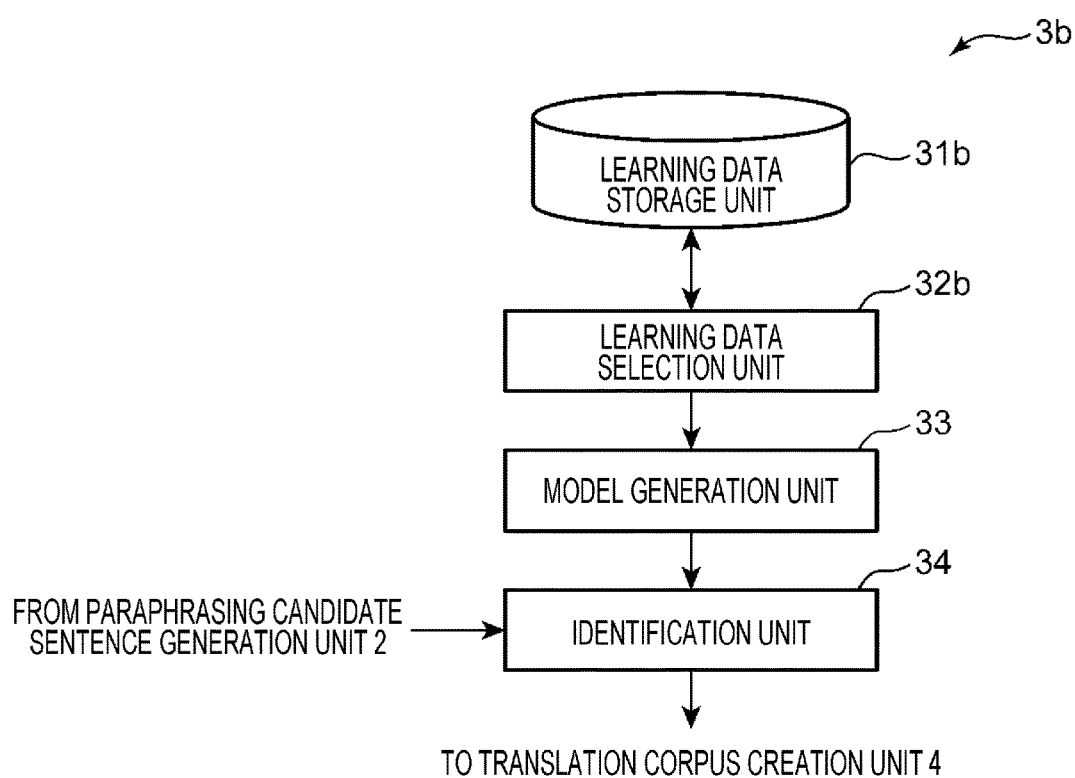
FIG. 15 is a block diagram that illustrates a configuration of a modification of the paraphrasing sentence identification unit in the translation corpus creation device.

FIG. 15 is a block diagram that illustrates a configuration of the modification of the paraphrasing sentence identification unit in the translation corpus creation device. FIG. 16 is a diagram for explaining an action of the paraphrasing sentence identification unit of the modification.

In this modification, the translation corpus creation device M includes a paraphrasing sentence identification unit 3b instead of the above-described paraphrasing sentence identification unit 3a. That is, as illustrated in FIG. 1, the translation corpus creation device M that includes the paraphrasing sentence identification unit 3b of the modification includes the input unit 1, the paraphrasing candidate sentence generation unit 2, the paraphrasing sentence identification unit 3b, the translation corpus creation unit 4, and the translation corpus storage unit 5. The input unit 1, the paraphrasing candidate sentence generation unit 2, the translation corpus creation unit 4, and the translation corpus storage unit 5 are similar to the above description, and a description thereof will thus not be made.

For example, as illustrated in FIG. 15, the paraphrasing sentence identification unit 3b of the modification includes a learning data storage unit 31b, a learning data selection unit 32b, the model generation unit 33, and the identification unit 34. The model generation unit 33 and the identification unit 34 are similar to the above description, and a description thereof will thus not be made.

The learning data storage unit 31b is connected with the learning data selection unit 32b and stores the learning data collection. The learning data collection is formed with plural data for generating the identification model that identifies whether or not the meaning of the paraphrasing candidate sentence is the same as the meaning of the first original sentence by learning. However, in this modification, the learning data collection is not classified but is one data collection that is formed with plural data which belong to various classifications. For example, the learning data collection in this modification is formed with plural data included in the learning data collection for factory, plural data included in the learning data collection for travel, plural data included in the learning data collection for purchase, plural data included in the learning data collection for medicine, and plural data included in the learning data collection for the railroad, which are described above. One specific example of the learning data collection of this modification is illustrated in FIG. 16 as a learning data collection LTc. In the example illustrated in FIG. 16, for example, data 305-1 are data that belong to the classification of travel, data 305-4 are data that belong to the classification of purchase, and data 305-8 are data that belong to the classification of factory.

The learning data selection unit 32b is connected with each of the input unit 1 and the model generation unit 33 and selects the data that correspond to the first original sentence received by the input unit 1 from the learning data collection stored in the learning data storage unit 31b in accordance with a prescribed selection method. As the prescribed selection method, for example, a similar selection method to the selection method that is used by the above-described learning data selection unit 32a may be employed. The learning data selection unit 32b outputs the selection result to the model generation unit 33.

The translation corpus creation device M that includes the paraphrasing sentence identification unit 3b of such a modification executes above-described processes S11 and S12 illustrated in FIG. 6 (process S13 is not executed) in the selection action of the paraphrasing DB and executes above-described processes S21 to S23 illustrated in FIG. 7 in the generation action of the paraphrasing candidate sentence.

Next, the translation corpus creation device M selects the data that correspond to the first original sentence of the input corpus acquired in process S11 from the learning data collection stored in the learning data storage unit 31b by the learning data selection unit 32b of the paraphrasing sentence identification unit 3b in accordance with the prescribed selection method in a data selection action for selecting the data from the learning data collection, instead of execution of above-described processes S31 and S32 illustrated in FIG. 8. For example, in the example illustrated in FIG. 16, three data 305-1, 305-2, and 305-3 surrounded by a bold frame are selected by the learning data selection unit 32b as the data that correspond to a first original sentence OS3 that is received by the input unit 1.

Then, the translation corpus creation device M executes above-described processes S41 and S42 illustrated in FIG. 9 by using the data selected by the learning data selection unit 32b as described in the generation action of the identification model and executes above-described processes S51 to S54 illustrated in FIG. 10 in the identification action of the paraphrasing sentence and the creation action of the translation corpus.

The translation corpus creation device M that includes the paraphrasing sentence identification unit 3b of the modification creates the translation corpus by such actions.

Such translation corpus creation device M, translation corpus creation method, and translation corpus creation program select the data that correspond to the first original sentence received by the input unit 1 from the learning data collection stored in the learning data storage unit 31b, identifies the one or plural paraphrasing sentences from the plural paraphrasing candidate sentences by the identification model that is generated based on the selected data, and may thus identify a further preferable paraphrasing sentence for the first original sentence and create a more accurate translation corpus. Further, the translation corpus creation device M, the translation corpus creation method, and the translation corpus creation program may reduce work and time for classifying data of the learning data collections.

Further, in the above-described embodiment, the translation corpus creation device M obtains one or plural paraphrasing sentences via plural paraphrasing candidate sentences from the first original sentence of the first and second original sentences that are input from the input unit 1, sets the one or plural paraphrasing sentences that are obtained and the second original sentence as a new pair of sentences, and thereby creates the translation corpus. However, in addition, the translation corpus creation device M may obtain one or plural second paraphrasing sentences via the plural second paraphrasing candidate sentences from the second original sentence, set the one or plural second paraphrasing sentences that are obtained and the first original sentence as a new pair of sentences, and thereby create the translation corpus.

Figure 17:
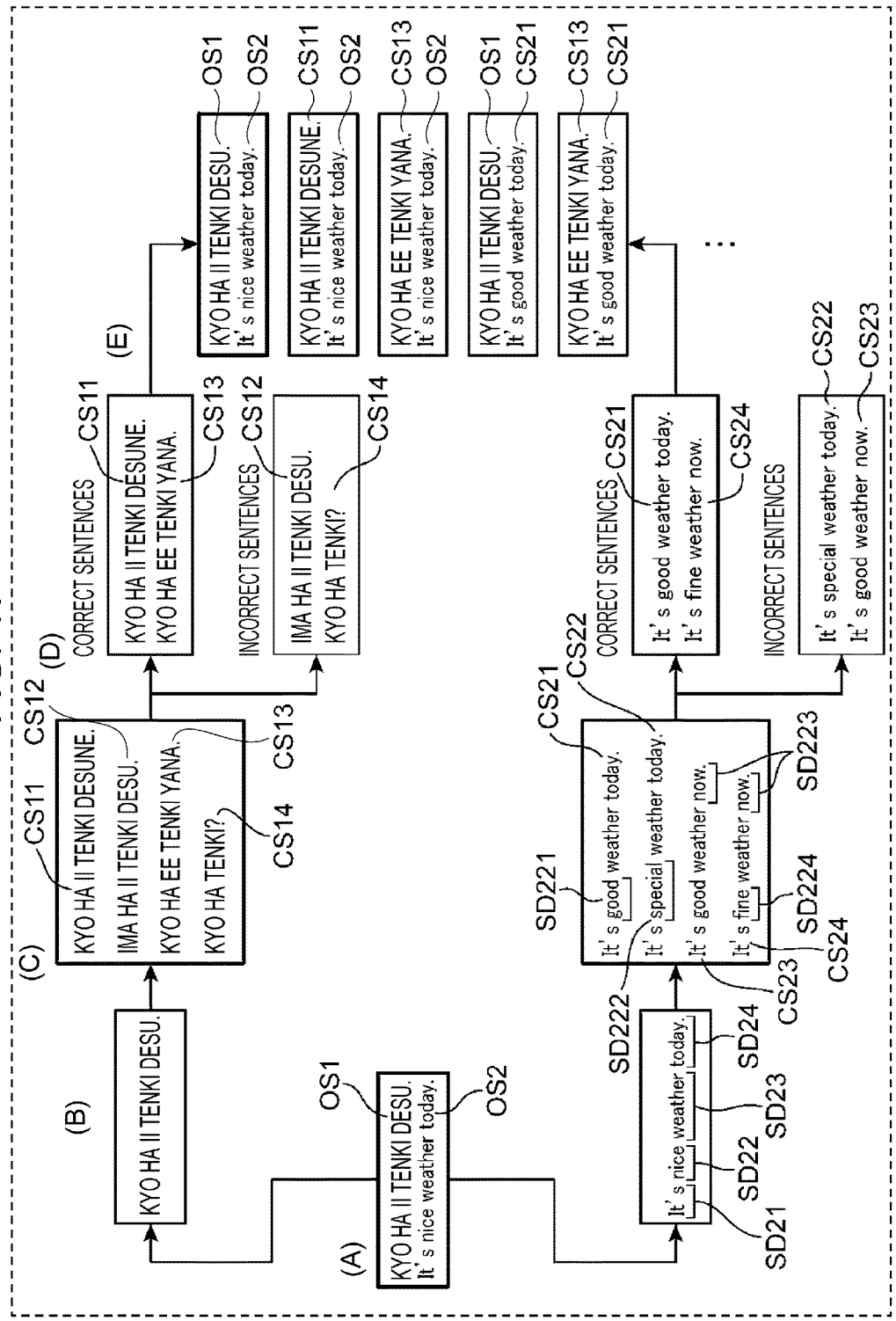
FIG. 17 is a diagram for explaining a modification of the translation corpus creation device by using one specific example.

FIG. 17 is a diagram for explaining a modification of the translation corpus creation device by using one specific example. In the translation corpus creation device M of such a modification, the paraphrasing candidate sentence generation unit 2 paraphrases one or plural fragments, which are included in the second original sentence which is received by the input unit 1, into other expressions in the first language and thereby further generates plural second paraphrasing candidate sentences for the second original sentence. The paraphrasing sentence identification unit 3a (3b) further identifies one or plural second paraphrasing candidate sentences in the same meaning as the meaning of the second original sentence from the plural second paraphrasing candidate sentences that are generated by the paraphrasing candidate sentence generation unit 2 as one or plural second paraphrasing sentences. The translation corpus creation unit 4 further generates a new second pair of sentences by setting one or plural second paraphrasing sentences identified by the paraphrasing sentence identification unit 3a (3b) and the first original sentence received by the input unit 1 as a pair of sentences, and further creates a new translation corpus with the generated and new second pair of sentences, or further creates a translation corpus by adding the generated and new second pair of sentences to an existing translation corpus. In this case, the translation corpus creation unit 4 may further generate a new second pair of sentences by setting the paraphrasing sentence that is generated based on the first original sentence (first paraphrasing sentence) and the second paraphrasing sentence that is generated based on the second original sentence as a pair of sentences, and further create a new translation corpus with the generated and new second pair of sentences, or further create a translation corpus by adding the generated and new second pair of sentences to the existing translation corpus.

A description will be made with one specific example by using the above-described first original sentence OS1 and second original sentence OS2 that are indicated in FIG. 14. In this example, as illustrated in the lower part of FIG. 17(B), the second original sentence OS2 is configured with four fragments SD21 to SD24. In the paraphrasing DB that is selected by above-described processes S11 to S13, following first fragment SD21k and second fragment SD22k are mutually associated (k is an integer of one to four in this example). A second fragment SD221 (see the lower part of FIG. 17(C)) is associated with the first fragment SD211 (not illustrated) that matches the fragment SD22 (SD22=SD211) (SD211⇔SD221). Further, a second fragment SD222 (see the lower part of FIG. 17(C)) is associated with a first fragment SD212 (not illustrated) that matches the fragment SD22. In addition, a second fragment SD224 (see the lower part of FIG. 17(C)) is associated with a first fragment SD214 (not illustrated) that matches the fragment SD22 (SD22=SD214) (SD214⇔SD224). A second fragment SD223 (see the lower part of FIG. 17(C)) is associated with a first fragment SD213 (not illustrated) that matches the fragment SD24 (SD24=SD213) (SD213⇔SD223).

In the generation of the second paraphrasing candidate sentence based on the second original sentence OS2 in such a case, as illustrated in FIGS. 17(B) and 17(C), in the second original sentence OS2, paraphrasing is performed by replacing the fragment SD22 by the second fragment SD221 by initial processes S22 and S23, and a second paraphrasing candidate sentence CS21 is generated from the second original sentence OS2. Paraphrasing is performed by replacing the fragment SD22 by the second fragment SD222 by next processes S22 and S23, and a second paraphrasing candidate sentence CS22 is generated from the second original sentence OS2. Paraphrasing is performed by replacing the fragment SD24 by the second fragment SD223 by next processes S22 and S23, and a second paraphrasing candidate sentence CS23 is generated from the second original sentence OS2. Then, paraphrasing is performed by respectively replacing the fragments SD22 and SD24 by the second fragments SD224 and SD223 by next processes S22 and S23, and a second paraphrasing candidate sentence CS24 is generated from the second original sentence OS2. As described above, four second paraphrasing candidate sentences CS21 to CS24 are generated from one second original sentence OS2.

In the identification of the paraphrasing sentence, process S53 is performed for each of the four second paraphrasing candidate sentences CS21 to CS24 that are indicated in FIG. 17(C). Consequently, as illustrated in FIG. 17(D), the two paraphrasing candidate sentences CS21 and CS24 are determined as correct sentences in the same meaning and set as the second paraphrasing sentences. However, the two paraphrasing candidate sentences CS22 and CS23 are determined as not in the same meaning or not correct sentences.

In the creation of the translation corpus, the second paraphrasing candidate sentence CS21 that is determined as the correct sentence, set as the second paraphrasing sentence, and indicated in the third part of FIG. 17(D) and the first original sentence OS1 indicated in FIG. 17(A) are set as a new pair of sentences as illustrated in the fourth part of FIG. 17(E). The second paraphrasing candidate sentence CS24 that is determined as the correct sentence, set as the paraphrasing sentence, and indicated in the third part of FIG. 17(D) and the first original sentence OS1 indicated in FIG. 17(A) are set as a new pair of sentences (not illustrated). In the example illustrated in FIG. 17, the second paraphrasing candidate sentence CS21 that is determined as the correct sentence, set as the second paraphrasing sentence, and indicated in the third part of FIG. 17(D) and the paraphrasing candidate sentence (first paraphrasing candidate sentence) CS13 that is determined as the correct sentence, set as the paraphrasing sentence (first paraphrasing sentence), and indicated in the first part of FIG. 17(D) are set as a new pair of sentences as illustrated in the fifth part of FIG. 17(E). Then, the translation corpus is created with those new pairs of sentences.

Such translation corpus creation device M, translation corpus creation method, and translation corpus creation program may automatically generate a paraphrasing sentence mutually by the first and second original sentences and create a translation corpus that accumulates further more pairs of sentences. Accordingly, the translation corpus creation device M, the translation corpus creation method, and the translation corpus creation program may further improve creation of a translation corpus. As described above, the translation corpus creation device M, the translation corpus creation method, and the translation corpus creation program may automatically generate sentences mutually by the first and second original sentences, thus further suppress the increase in the cost, and further reduce the unit price that is requested for collection of one pair of sentences.

Further, in the above-described embodiment, the paraphrasing sentence identification units 3a and 3b perform the machine learning with a teacher but may perform machine learning without a teacher but by using a cluster analysis and so forth, for example. In a case where the machine learning without a teacher is performed, data of the learning data collections are collected from the Internet by a so-called crawler, and the learning data storage unit 31a and 31b may thereby be omitted.

Next, another embodiment will be described.

Second Embodiment; Machine Translation System

Figure 18:
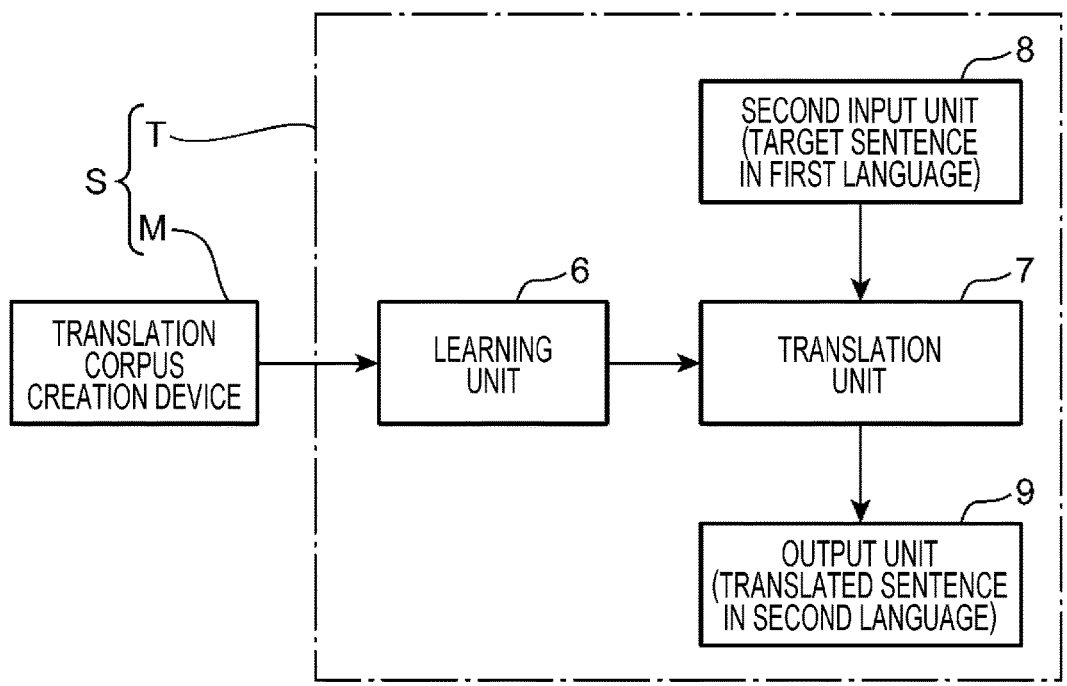
FIG. 18 is a block diagram that illustrates a configuration of a machine translation system according to a second embodiment.
Figure 19:
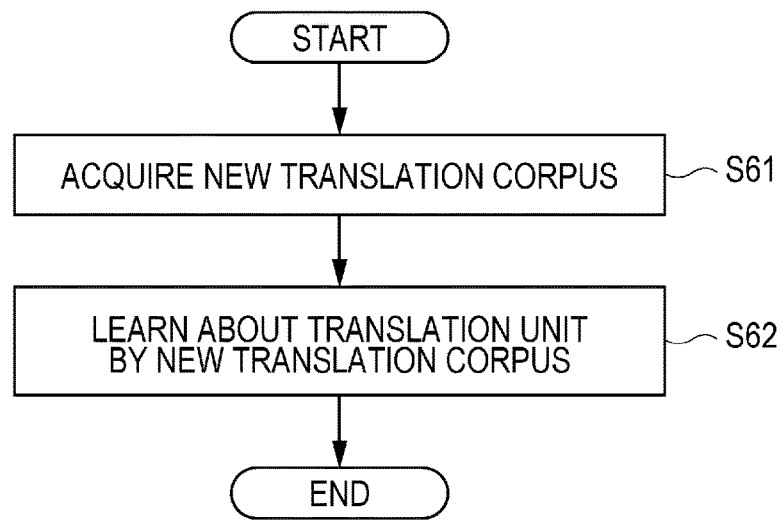
FIG. 19 is a flowchart that illustrates an action of a learning unit in the machine translation system.

FIG. 18 is a block diagram that illustrates a configuration of a machine translation system according to a second embodiment. FIG. 19 is a flowchart that illustrates an action of a learning unit in the machine translation system.

In the first embodiment, descriptions are made about the translation corpus creation device M and the translation corpus creation method and translation corpus creation program that are implemented in the translation corpus creation device M, in which the modifications are included. In the second embodiment, a description will be made about a machine translation system that uses the translation corpus creation device M, that is, that implements the translation corpus creation method and the translation corpus creation program.

As illustrated in FIG. 18, a machine translation system S in the second embodiment includes the translation corpus creation device M and a translation device T, for example.

The translation corpus creation device M is a device that creates a translation corpus, in which plural pairs of sentences are collected, each pair having a first sentence in a first language paired with a second sentence in a second language different from the first language. The translation corpus creation device M is the device described in the first embodiment (including the modifications). That is, the translation corpus creation device M implements the translation corpus creation method and the translation corpus creation program that are described in the first embodiment.

The translation device T is a device that translates a target sentence as a translation target between the first language and the second language based on the translation corpus which is created by the translation corpus creation device M. The translation device T includes a learning unit 6, a translation unit 7, a second input unit 8, and an output unit 9, for example.

The second input unit 8 is an apparatus that is connected with the translation unit 7 and inputs various kinds of commands such as a command for an instruction to start translation and various kinds of data which are requested for translation of the target sentence or the like in the first language, for example, and is a keyboard, a mouse, or the like, for example. The output unit 9 is an apparatus that is connected with the translation unit 7 and outputs commands or data input from the second input unit 8, a translated sentence in the second language, the translated sentence being translated by the translation unit 7, and so forth and is a display device such as a CRT display, a liquid crystal display (LCD), or an organic EL display or a printing device such as a printer, for example.

A touch panel may be configured with the second input unit 8 and the output unit 9. In a case of configuring the touch panel, the second input unit 8 is a position input device of a resistive film type, a capacitive type, or the like, for example, which detects and inputs an operation position, and the output unit 9 is a display device. In the touch panel, the position input device is provided on a display surface of the display device, one or plural candidates of input contents that may be input are displayed on the display device. In a case where a user touches a display position that displays the input content to be input, the position is detected by the position input device, and the display content that is displayed in the detected position is input to the translation device T as an operation input content of the user. Such a touch panel facilitates intuitive understanding of input operations by the user and provides the translation device T (the machine translation system S) that is easy for the user to handle.

The learning unit 6 is connected with the translation unit 7 and generates or learns a translation model of the translation unit 7 by using the translation corpus that is created by the translation corpus creation device M.

The translation unit 7 translates the target sentence in the first language that is received by the second input unit 8 into the second language, generates the translated sentence in the second language, and outputs the translated sentence to the output unit 9.

The translation device T that includes such units 6 to 9 is configured with an information processing device such as a computer of a desktop type, a laptop type, or a tablet type, for example.

In such a machine translation system S, the translation corpus creation device M creates a new translation corpus by each of the actions that are described in the first embodiment. Next, in FIG. 19, the learning unit 6 acquires the new translation corpus that is created by the translation corpus creation device M (S61) and generates or learns the translation model of the translation unit 7 by using the acquired new translation corpus (S62). The translation corpus creation device M in this embodiment includes more example sentences as described in the first embodiment and may thus generate or learn the translation model of the translation unit 7 more accurately. Then, when the target sentence is received from the second input unit 8 and an instruction of translation is made, the translation unit 7 translates the target sentence and outputs the translated sentence to the output unit 9. As described above, the translation unit 7 may more accurately translate because the learning unit 6 generates or learns the translation model more accurately.

Such a machine translation system S includes the above-described translation corpus creation device M that implements the translation corpus creation method and the translation corpus creation program, which are described in the first embodiment, and thus may automatically generate the paraphrasing sentence and create the translation corpus that accumulates more pairs of sentences. Accordingly, the machine translation system S may improve creation of a translation corpus. As described above, the machine translation system S may automatically generate sentences, thus suppress the increase in the cost, and reduce the unit price that is requested for collection of one pair of sentences.

In the above-described second embodiment, the translation corpus creation device M and the translation device T may be connected together such that those may communicate with each other via a network. Further, the translation device T may be configured with a first main device that includes the learning unit 6 and a second main device that includes the translation unit 7, the second input unit 8, and the output unit 9. The first main device and the second main device may be connected together such that those may communicate with each other via a network.

Further, in the above-described embodiment, the translation corpus creation device M and the translation device T are respectively configured with individual information processing devices. However, those may be integrated and configured with one information processing device.

Techniques of various aspects as described above are disclosed herein. Main techniques among those will be summarized below.

A translation corpus creation method according to one aspect is a translation corpus creation method of creating a translation corpus in which plural pairs of sentences are collected, each pair having a first sentence in a first language paired with a second sentence in a second language different from the first language, the translation corpus creation method including: a reception step of receiving a first original sentence in the first language and a second original sentence that is the first original sentence which is translated into the second language; a paraphrasing candidate sentence generation step of generating plural paraphrasing candidate sentences for the first original sentence by paraphrasing one or plural fragments among plural fragments that are formed by dividing a sentence by following a preset and prescribed rule and that are included in the first original sentence received in the reception step into other expressions in the first language; a paraphrasing sentence identification step of identifying one or plural paraphrasing candidate sentences in the same meaning as the meaning of the first original sentence from the plural paraphrasing candidate sentences that are generated in the paraphrasing candidate sentence generation step as one or plural paraphrasing sentences; and a translation corpus creation step of generating a new pair of sentences by setting the one or plural paraphrasing sentences that are identified in the paraphrasing sentence identification step and the second original sentence that is received in the reception step as a pair of sentences to create a new translation corpus with the generated and new pair of sentences or to create a translation corpus by adding the generated and new pair of sentences to an existing translation corpus.

Such a translation corpus creation method may automatically generate the paraphrasing sentence and create the translation corpus that accumulates more pairs of sentences. Accordingly, the translation corpus creation method may improve creation of a translation corpus. Particularly, a relatively high cost is usually requested for creation of the translation corpus that accumulates more pairs of sentences because work and time are requested for collection of pairs of sentences. However, as described above, the translation corpus creation method may automatically generate sentences, thus suppress the increase in the cost, and reduce the unit price that is requested for collection of one pair of sentences. Note that the pairs of sentences include one-to-one pairs of sentences, multiple-to-one pairs of sentences, and one-to-multiple pairs of sentences between sentences in the first language and sentences in the second language different from the first language.

Further, another aspect provides the above-described translation corpus creation method, in which the paraphrasing candidate sentence generation step includes: a paraphrasing database selection step of selecting a paraphrasing database that corresponds to the first original sentence received in the reception step from plural paraphrasing databases that include a first fragment in the first language and a second fragment which is associated with the first fragment and expresses the first fragment by another expression in the first language and that are classified by following a preset and prescribed classification scheme; and a paraphrasing step of paraphrasing one or plural fragments among the plural fragments that are included in the first original sentence received in the reception step into other expressions in the first language based on the paraphrasing database selected in the paraphrasing database selection step to generate plural paraphrasing candidate sentences for the first original sentence.

Such a translation corpus creation method selects the paraphrasing database that corresponds to the first original sentence received in the reception step from the plural paraphrasing databases, generates the plural paraphrasing candidate sentences for the first original sentence based on the selected paraphrasing database, and may thus generate further preferable paraphrasing candidate sentences for the first original sentence and create a more accurate translation corpus.

Further, another aspect provides the above-described translation corpus creation methods, in which the paraphrasing sentence identification step includes: a learning data selection step of selecting a learning data collection that corresponds to the first original sentence received in the reception step from plural learning data collections that are formed with plural data for generating, by learning, an identification model which identifies whether or not the meaning of the paraphrasing candidate sentence is the same as the meaning of the first original sentence and that are classified by following a preset and prescribed classification scheme; a model generation step of generating the identification model based on the learning data collection selected in the learning data selection step; and an identification step of identifying the one or plural paraphrasing sentences from the plural paraphrasing candidate sentences that are generated in the paraphrasing candidate sentence generation step based on the identification model which is generated in the model generation step.

Such a translation corpus creation method selects the learning data collection that corresponds to the first original sentence received in the reception step from the plural learning data collections, identifies the one or plural paraphrasing sentences from the plural paraphrasing candidate sentences by the identification model that is generated based on the selected learning data collection, and may thus identify a further preferable paraphrasing sentence for the first original sentence and create a more accurate translation corpus.

Further, another aspect provides the above-described translation corpus creation methods, in which the paraphrasing sentence identification step includes: a second learning data selection step of selecting data that correspond to the first original sentence received in the reception step from a learning data collection that is formed with plural data for generating, by learning, an identification model which identifies whether or not the meaning of the paraphrasing candidate sentence is the same as the meaning of the first original sentence; a second model generation step of generating the identification model based on the data selected in the second learning data selection step; and a second identification step of identifying the one or plural paraphrasing sentences from the plural paraphrasing candidate sentences that are generated in the paraphrasing candidate sentence generation step based on the identification model generated in the second model generation step.

Such a translation corpus creation method selects the data that correspond to the first original sentence received in the reception step from the learning data collection, identifies the one or plural paraphrasing sentences from the plural paraphrasing candidate sentences by the identification model that is generated based on the selected data, and may thus identify a further preferable paraphrasing sentence for the first original sentence and create a more accurate translation corpus.

Further, another aspect provides the above-described translation corpus creation methods, in which the paraphrasing candidate sentence generation step includes further generating plural second paraphrasing candidate sentences for the second original sentence by paraphrasing one or plural fragments among the plural fragments that are included in the second original sentence received in the reception step into other expressions in the first language, the paraphrasing sentence identification step includes further identifying one or plural second paraphrasing candidate sentences in the same meaning as the meaning of the second original sentence from the plural second paraphrasing candidate sentences that are generated in the paraphrasing candidate sentence generation step as one or plural second paraphrasing sentences, and the translation corpus creation step includes further generating a new second pair of sentences by setting the one or plural second paraphrasing sentences that are identified in the paraphrasing sentence identification step and the first original sentence that is received in the reception step as a pair of sentences to further create a new translation corpus with the generated and new second pair of sentences or to further create a translation corpus by adding the generated and new second pair of sentences to an existing translation corpus.

Such a translation corpus creation method may automatically generate the paraphrasing sentence mutually by the first and second original sentences and create a translation corpus that accumulates further more pairs of sentences. Accordingly, the translation corpus creation method may further improve creation of a translation corpus. As described above, the translation corpus creation method may automatically generate sentences mutually by the first and second original sentences, thus further suppress the increase in the cost, and further reduce the unit price that is requested for collection of one pair of sentences.

Further, a translation corpus creation device according to another aspect is a translation corpus creation device that creates a translation corpus in which plural pairs of sentences are collected, each pair having a first sentence in a first language paired with a second sentence in a second language different from the first language, the translation corpus creation device including: an input unit that receives a first original sentence in the first language and a second original sentence that is the first original sentence which is translated into the second language; a paraphrasing candidate sentence generation unit that generates plural paraphrasing candidate sentences for the first original sentence by paraphrasing one or plural fragments among plural fragments that are formed by dividing a sentence by following a preset and prescribed rule and that are included in the first original sentence received in the input unit into other expressions in the first language; a paraphrasing sentence identification unit that identifies one or plural paraphrasing candidate sentences in the same meaning as the meaning of the first original sentence from the plural paraphrasing candidate sentences that are generated by the paraphrasing candidate sentence generation unit as one or plural paraphrasing sentences; and a translation corpus creation unit that generates a new pair of sentences by setting the one or plural paraphrasing sentences that are identified by the paraphrasing sentence identification unit and the second original sentence that is received by the input unit as a pair of sentences to create a new translation corpus with the generated and new pair of sentences or to create a translation corpus by adding the generated and new pair of sentences to an existing translation corpus.

A translation corpus creation program according to another aspect is a translation corpus creation program that creates a translation corpus in which plural pairs of sentences are collected, each pair having a first sentence in a first language paired with a second sentence in a second language different from the first language, the translation corpus creation program causing a computer to execute: a reception step of receiving a first original sentence in the first language and a second original sentence that is the first original sentence which is translated into the second language; a paraphrasing candidate sentence generation step of generating plural paraphrasing candidate sentences for the first original sentence by paraphrasing one or plural fragments among plural fragments that are formed by dividing a sentence by following a preset and prescribed rule and that are included in the first original sentence received in the reception step into other expressions in the first language; a paraphrasing sentence identification step of identifying one or plural paraphrasing candidate sentences in the same meaning as the meaning of the first original sentence from the plural paraphrasing candidate sentences that are generated in the paraphrasing candidate sentence generation step as one or plural paraphrasing sentences; and a translation corpus creation step of generating a new pair of sentences by setting the one or plural paraphrasing sentences that are identified in the paraphrasing sentence identification step and the second original sentence that is received in the reception step as a pair of sentences to create a new translation corpus with the generated and new pair of sentences or to create a translation corpus by adding the generated and new pair of sentences to an existing translation corpus.

Such a translation corpus creation device and a translation corpus creation program may automatically generate the paraphrasing sentence and create a translation corpus that accumulates more pairs of sentences. Accordingly, the translation corpus creation device and the translation corpus creation program may improve creation of a translation corpus. Particularly, a relatively high cost is usually requested for creation of the translation corpus that accumulates more pairs of sentences because work and time are requested for collection of pairs of sentences. However, as described above, the translation corpus creation device and the translation corpus creation program may automatically generate sentences, thus suppress the increase in the cost, and reduce the unit price that is requested for collection of one pair of sentences.

Further, a machine translation system according to another aspect includes: a translation corpus creation device that creates a translation corpus in which plural pairs of sentences are collected, each pair having a first sentence in a first language paired with a second sentence in a second language different from the first language; and a translation device that translates a target sentence as a translation target between the first language and the second language based on the translation corpus which is created by the translation corpus creation device, in which the translation corpus creation device implements any one of the above-described translation corpus creation methods.

Such a machine translation system includes the translation corpus creation device that implements any one of the above-described translation corpus creation methods and thus may automatically generate the paraphrasing sentence and create a translation corpus that accumulates more pairs of sentences. Accordingly, the machine translation system may improve creation of a translation corpus. As described above, the machine translation system may automatically generate sentences, thus suppress the increase in the cost, and reduce the unit price that is requested for collection of one pair of sentences.

In order to express the present disclosure, the present disclosure has appropriately and sufficiently been described through the embodiments with reference to the drawings in the above description. However, it should be understood that a person having ordinary skill in the art may easily change and/or improve the above-described embodiments. Accordingly, unless changed forms or improved forms that are carried out by a person having ordinary skill in the art depart from the scope of rights of the claims, the changed forms or the improved forms are construed as included in the scope of rights of the claims.

The techniques of the present disclosure may provide a translation corpus creation method, a translation corpus creation device, and a recording medium storing a translation corpus creation program, which are further improved, and a machine translation system that uses the translation corpus creation device.

What is claimed is:

1. A translation corpus creation method comprising:
   receiving a first original sentence in a first language and a second original sentence that is the first original sentence which is translated into a second language different from the first language, by using a processor;
   generating plural paraphrasing candidate sentences for the first original sentence by paraphrasing one or more fragments of plural fragments that are obtained by dividing the first original sentence using a preset and prescribed rule, into other expressions in the first language, by using the processor;
   identifying one or more paraphrasing candidate sentences having a same meaning as a meaning of the first original sentence, of the plural paraphrasing candidate sentences, as one or more paraphrasing sentences, by using the processor; and
   creating a translation corpus by generating a new set of sentences by associating the one or more paraphrasing sentences with the second original sentence, and by creating a new translation corpus with the new set of sentences or by adding the new set of sentences to an existing translation corpus, by using the processor.

2. The translation corpus creation method according to claim 1, wherein
   the generating of the plural paraphrasing candidate sentences includes:
   selecting a paraphrasing database that corresponds to the first original sentence from plural paraphrasing databases that include a first fragment in the first language and a second fragment which is associated with the first fragment and expresses the first fragment by another expression in the first language and that are classified by following a preset and prescribed classification scheme, and
   generating the plural paraphrasing candidate sentences for the first original sentence by paraphrasing one or more fragments of the plural fragments that are included in the first original sentence into the other expressions in the first language based on the selected paraphrasing database.

3. The translation corpus creation method according to claim 1, wherein
   the identifying of the one or more paraphrasing candidate sentences includes:
   selecting a learning data collection that corresponds to the first original sentence from plural learning data collections that are formed of plural data for generating, by learning, an identification model which identifies whether or not the meaning of the paraphrasing candidate sentence is the same as the meaning of the first original sentence and that are classified using a preset and prescribed classification scheme,
   generating the identification model based on the selected learning data collection, and
   identifying the one or more paraphrasing sentences, of the plural paraphrasing candidate sentences, based on the identification model.

4. The translation corpus creation method according to claim 1, wherein
   the identifying of the one or more paraphrasing sentences includes:
   selecting data that correspond to the first original sentence from a learning data collection that is formed of plural data for generating, by learning, an identification model which identifies whether or not the meaning of the paraphrasing candidate sentence is the same as the meaning of the first original sentence,
   generating the identification model based on the selected data, and
   identifying the one or more paraphrasing sentences, of the plural paraphrasing candidate sentences, based on the generated identification model.

5. The translation corpus creation method according to claim 1, wherein
   the generating of the plural paraphrasing candidate sentences includes generating plural second paraphrasing candidate sentences for the second original sentence by paraphrasing one or more fragments of the plural fragments that are obtained by dividing the second original sentence, into other expressions in the first language,
   the identifying of the one or more paraphrasing sentences includes identifying one or more second paraphrasing candidate sentences in a same meaning as a meaning of the second original sentence from the plural second paraphrasing candidate sentences as one or more second paraphrasing sentences, and
   the creating of the translation corpus includes further creating a translation corpus by further generating a new second set of sentences by associating the identified one or more second paraphrasing sentences with the first original sentence, and by creating a new translation corpus with the new second set of sentences or by adding the new second set of sentences to the existing translation corpus.

6. A translation corpus creation device comprising:
   a processor; and
   a medium storing a computer program, the computer program causing the processor to execute operations including:
   receiving a first original sentence in a first language and a second original sentence that is the first original sentence which is translated into a second language different from the first language;

generating plural paraphrasing candidate sentences for the first original sentence by paraphrasing one or more fragments of plural fragments that are obtained by dividing the first original sentence using a preset and prescribed rule, into other expressions in the first language;

identifying one or more paraphrasing candidate sentences having a same meaning as a meaning of the first original sentence, of the plural paraphrasing candidate sentences, as one or more paraphrasing sentences; and creating a translation corpus by generating a new set of sentences by associating the one or more paraphrasing sentences with the second original sentence, and by creating a new translation corpus with the new set of sentences or by adding the new set of sentences to an existing translation corpus.

7. A non-transitory recording medium storing a computer program, the computer program causing a processor to execute operations comprising:

receiving a first original sentence in a first language and a second original sentence that is the first original sentence which is translated into a second language different from the first language;

generating plural paraphrasing candidate sentences for the first original sentence by paraphrasing one or more fragments of plural fragments that are obtained by dividing the first original sentence using a preset and prescribed rule, into other expressions in the first language;

identifying one or more paraphrasing candidate sentences having a same meaning as a meaning of the first original sentence, of the plural paraphrasing candidate sentences, as one or more paraphrasing sentences; and creating a translation corpus by generating a new set of sentences by associating the one or more paraphrasing sentences with the second original sentence, and by creating a new translation corpus with the new set of sentences or by adding the new set of sentences to an existing translation corpus.

8. A machine translation system comprising:

a translation corpus creation device that creates a translation corpus in which plural sets of sentences are collected, each set including a first sentence in a first language associated with a second sentence in a second language different from the first language; and a translation device that translates a target sentence as a translation target between the first language and the second language based on the translation corpus which is created by the translation corpus creation device, wherein the translation corpus creation device implements the translation corpus creation method according to claim 1.

* * * * *